(12) United States Patent
Nakanishi et al.

(10) Patent No.: US 8,525,956 B2
(45) Date of Patent: Sep. 3, 2013

(54) LIQUID CRYSTAL DISPLAY DEVICE AND MANUFACTURING METHOD THEREOF

(75) Inventors: Yohei Nakanishi, Kawasaki (JP); Yuichi Inoue, Kawasaki (JP); Kazutaka Hanaoka, Kawasaki (JP); Hidefumi Yoshida, Kawasaki (JP); Yasutoshi Tasaka, Kawasaki (JP); Kunihiro Tashiro, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/533,817

(22) Filed: Jun. 26, 2012

(65) Prior Publication Data

US 2012/0261846 A1    Oct. 18, 2012

Related U.S. Application Data

(62) Division of application No. 12/915,675, filed on Oct. 29, 2010, now Pat. No. 8,243,241, which is a division of application No. 11/063,047, filed on Feb. 22, 2005, now Pat. No. 7,843,531.

(30) Foreign Application Priority Data

Sep. 13, 2004    (JP) .................................. 2004-265552

(51) Int. Cl.
*G02F 1/1333*    (2006.01)
(52) U.S. Cl.
USPC .............................................. 349/93; 349/94
(58) Field of Classification Search
None
See application file for complete search history.

(56) References Cited

U.S. PATENT DOCUMENTS

| 4,834,509 A | 5/1989 | Gunjima et al. |
| 5,612,803 A | 3/1997 | Yamada et al. |
| 5,729,318 A | 3/1998 | Yamada et al. |
| 5,739,889 A | 4/1998 | Yamada et al. |
| 5,751,382 A | 5/1998 | Yamada et al. |
| 5,777,000 A | 7/1998 | Sakagami et al. |

(Continued)

FOREIGN PATENT DOCUMENTS

| CN | 1112685 A | 11/1995 |
| EP | 0 272 585 | 6/1988 |

(Continued)

OTHER PUBLICATIONS

Office Action issued by the Patent Office of Japan for corresponding JP Application No. 2009-101597, mailed May 8, 2012.

(Continued)

*Primary Examiner* — Wen-Ying P Chen
(74) *Attorney, Agent, or Firm* — Greer, Burns & Crain, Ltd.

(57) ABSTRACT

A manufacturing method of a liquid crystal display device having a liquid crystal layer between a pair of substrates. The method includes disposing between the pair of substrates a liquid crystal composition including liquid crystal molecules and a polymerizable compound that is polymerizable by active energy rays or a combination of active energy rays and heat, and polymerizing the polymerizable compound by active energy ray irradiation, or by both active energy ray irradiation and heat with and/or without applying voltages to the liquid crystal layer, so that a polymer formed by the polymerizing process decides an alignment of the liquid crystal molecules when no voltage is applied. The amount of active energy ray irradiation is decided so that at least some of the polymerizable compound remains in the liquid crystal layer after the polymerization process. Further the amount of the polymerizable compound that remains is not more than a predetermined value.

12 Claims, 17 Drawing Sheets

(56) References Cited

U.S. PATENT DOCUMENTS

| | | | |
|---|---|---|---|
| 5,959,707 | A | 9/1999 | Murai et al. |
| 5,959,763 | A | 9/1999 | Bozler et al. |
| 5,986,736 | A | 11/1999 | Kodera et al. |
| 6,452,653 | B1 | 9/2002 | Yamanaka et al. |
| 6,671,019 | B1 | 12/2003 | Petschek et al. |
| 6,671,025 | B1 | 12/2003 | Ikeda et al. |
| 6,690,441 | B2 | 2/2004 | Moriya |
| 6,710,837 | B1 | 3/2004 | Song et al. |
| 6,724,452 | B1 | 4/2004 | Takeda et al. |
| 6,778,229 | B2 | 8/2004 | Inoue et al. |
| 6,781,665 | B2 | 8/2004 | Nakanishi et al. |
| 6,825,892 | B2 | 11/2004 | Inoue et al. |
| 6,894,741 | B2 | 5/2005 | Nakanishi et al. |
| 6,894,742 | B2 | 5/2005 | Inoue et al. |
| 2001/0019376 | A1 | 9/2001 | Kim |
| 2001/0026346 | A1 | 10/2001 | Nagasako |
| 2002/0047982 | A1 | 4/2002 | Sonoda et al. |
| 2002/0051107 | A1 | 5/2002 | Nagayama et al. |
| 2003/0043336 | A1 | 3/2003 | Sasaki et al. |
| 2003/0058377 | A1 | 3/2003 | Chae et al. |
| 2003/0071952 | A1 | 4/2003 | Yoshida et al. |
| 2003/0095229 | A1 | 5/2003 | Inoue et al. |
| 2003/0151703 | A1 | 8/2003 | Nakanishi et al. |
| 2003/0202146 | A1 | 10/2003 | Takeda et al. |
| 2004/0075798 | A1 | 4/2004 | Inoue et al. |
| 2004/0080697 | A1 | 4/2004 | Song et al. |
| 2004/0160561 | A1 | 8/2004 | Koma |
| 2004/0169790 | A1 | 9/2004 | Inoue et al. |
| 2004/0174471 | A1 | 9/2004 | Inoue et al. |
| 2005/0018105 | A1 | 1/2005 | Inoue et al. |
| 2005/0128397 | A1 | 6/2005 | Sasaki et al. |
| 2005/0259209 | A1 | 11/2005 | Takeda et al. |
| 2009/0290111 | A1 | 11/2009 | Sasaki et al. |

FOREIGN PATENT DOCUMENTS

| | | |
|---|---|---|
| EP | 0 884 626 | 12/1998 |
| JP | 61-011725 | 1/1986 |
| JP | 5-265046 | 10/1993 |
| JP | 7-120765 | 5/1995 |
| JP | 10-239669 | 9/1998 |
| JP | 10-333180 | 12/1998 |
| JP | 11-095221 | 4/1999 |
| JP | 11-242225 | 9/1999 |
| JP | 11-337969 | 12/1999 |
| JP | 11-352489 | 12/1999 |
| JP | 11-352490 | 12/1999 |
| JP | 11-352491 | 12/1999 |
| JP | 2000-155317 | 6/2000 |
| JP | 2000-193976 | 7/2000 |
| JP | 2000-305086 | 11/2000 |
| JP | 2001-174824 | 6/2001 |
| JP | 2001-281677 | 10/2001 |
| JP | 2001-305556 | 10/2001 |
| JP | 2002-090714 | 3/2002 |
| JP | 2002-202503 | 7/2002 |
| JP | 2002-207121 | 7/2002 |
| JP | 2003-149647 | 5/2003 |
| JP | 2003-177408 | 6/2003 |
| JP | 2003-177418 | 6/2003 |
| JP | 2003-228050 | 8/2003 |
| JP | 2003-279946 | 10/2003 |
| JP | 2003-279995 | 10/2003 |
| JP | 2003-295192 | 10/2003 |
| JP | 2003-307720 | 10/2003 |
| JP | 2003-315810 | 11/2003 |

OTHER PUBLICATIONS

Notice of Allowance issued in corresponding U.S. Appl. No. 13/533,860, mailed on Apr. 2, 2013.

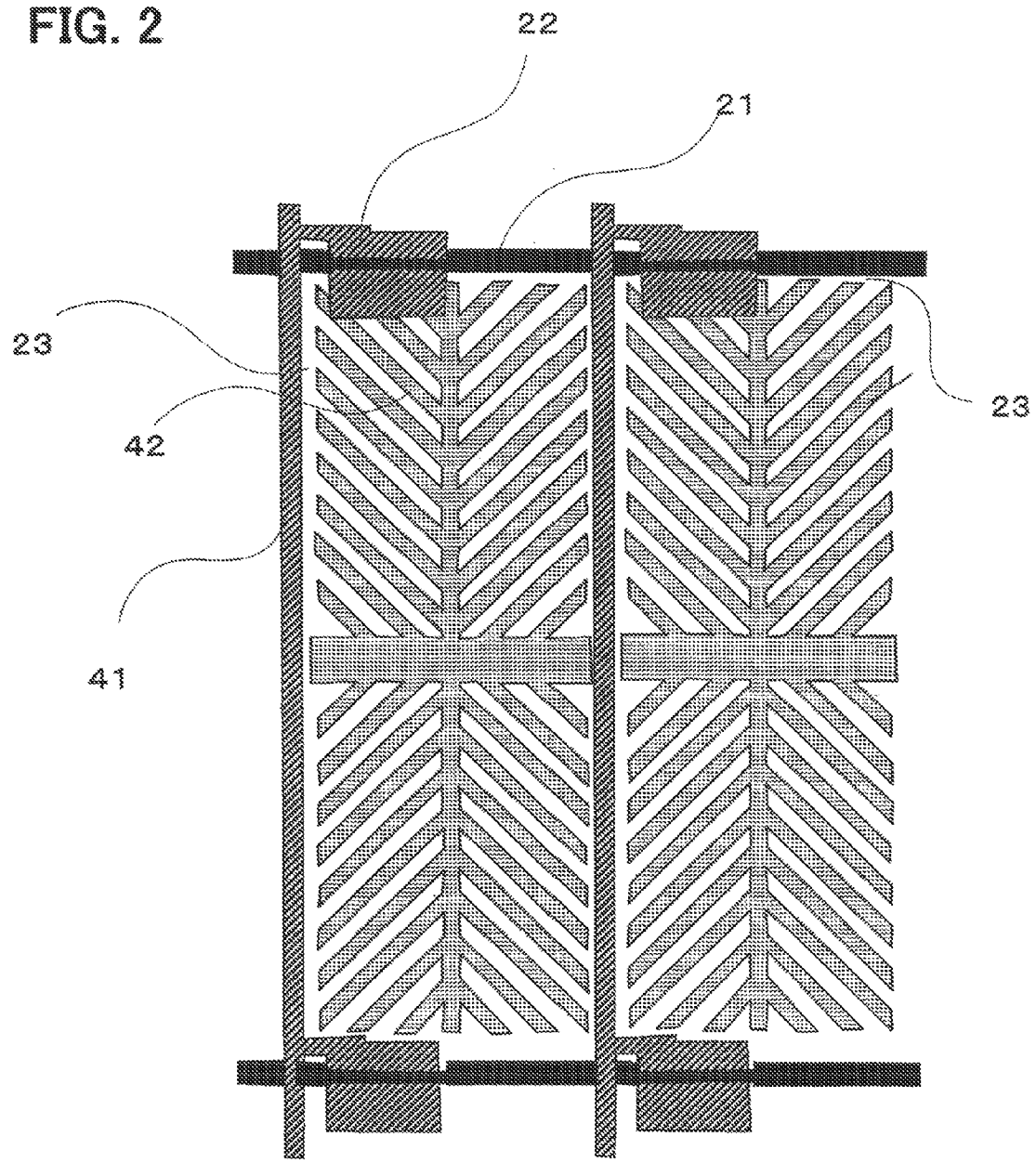

LIQUID CRYSTAL DISPLAY DEVICE AND MANUFACTURING METHOD THEREOF

CROSS-REFERENCE TO RELATED APPLICATIONS

This is a Divisional of application Ser. No. 12/915,675, filed on Oct. 29, 2010, which is a Divisional of application Ser. No. 11/063,047 filed on Feb. 22, 2005, now U.S. Pat. No. 7,843,531.

This application is based upon and claims the benefit of priority from the prior Japanese Patent Application No. 2004-265552, filed on Sep. 13, 2004, the entire contents of which are incorporated herein by reference.

BACKGROUND OF THE INVENTION

1. Field of the Invention

The present invention relates, for example, to a liquid crystal display device wherein a liquid crystal composition comprising a liquid crystal and a polymerizable compound that can be polymerized by active energy rays or a combination of the active energy rays and heat, is disposed between two substrates, and then, the polymerizable compound is polymerized with or without applying voltage to the liquid crystal so as to regulate the alignment direction of liquid crystal molecules.

2. Description of the Related Art

An active matrix liquid crystal display formed of TN mode, which was once in the mainstream of the liquid crystal display, has a weak point of a narrow viewing angle characteristic. At present, the techniques termed MVA (multi-domain vertical alignment) mode and IPS (in-plane switching) mode are adopted for wide-viewing-angle liquid crystal panels.

In the IPS mode, liquid crystal molecules are switched in a horizontal plane by a comb electrode. However, since the comb electrode markedly reduces aperture ratio, a robust backlight is required.

In the MVA mode, the liquid crystal molecules are aligned vertically to the substrates, and the alignment of the liquid crystal molecules is regulated by protrusions or slits (cutouts) provided on a transparent electrode (formed of, for example, ITO: indium tin oxide). Generally speaking, in the case of wide slits, the liquid crystal molecules are aligned along the direction orthogonal to a slit, while the liquid crystal molecules are aligned along the direction parallel with a slit in the case of narrow slits (fine-structured slits).

In the present MVA mode, for the purpose of obtaining a wide viewing angle, protrusions or ITO slits with complicated shapes are disposed, so that the liquid crystal molecules incline in four directions, 45°, 135°, 225° and 315°, against bus lines for signal electrodes and scanning electrodes when voltage is applied. With this technique, when voltage is applied, the liquid crystal molecules are stabilized by inclining in the four directions in parallel with the fine slits, thereby multi-domain alignment can be achieved.

In the invention disclosed in Japanese Unexamined Patent Application Publication No. 2003-149647, there has been developed a technique with a structure as shown in FIG. 2 having no protrusions in which liquid crystal molecules incline in four directions by the ITO slits when voltage is applied. At this time, by injecting a liquid crystal composition comprising a polymerizable compound between substrates, and memorizing the falling directions of the liquid crystal molecules by polymerizing the polymerizable compound while voltage is applied thereto, it is possible to shorten a response time when the falling direction of the liquid crystal molecules is propagated toward the center of a pixel, affected by the fact that the falling directions of the liquid crystal molecules are determined by the electric field at an ITO end, thereby improving the display switching characteristic.

However, even if such a complicated disposition is adopted, irregularity in the alignment of the liquid crystal molecules occurs in the vicinity of the gap located between a pixel electrode and at least either a signal electrode or a scanning electrode, when viewed from a direction substantially normal to the display screen of a liquid crystal display device. The reason for this is as follows: a side of the pixel electrode facing at least either one of the signal electrodes and the scanning electrodes is disposed in parallel with the signal electrode or the scanning electrode concerned; since the liquid crystal molecules have a property of being apt to tilt toward an electrode, the falling direction of the liquid crystal molecules in the vicinity of the above-mentioned side (end portion of the pixel electrode) becomes perpendicular to at least either one of the signal electrodes and the scanning electrodes; and, as a result, an alignment state is not stabilized in the vicinity of the pixel electrode, and the disclination is produced, which causes a varied display state.

To cope with this problem, there has been proposed a method in which auxiliary protrusions are disposed for controlling the alignment, and the portions where the alignment varies is shielded by a light-shielding layer (black matrix). However, there arises another problem of a smaller aperture ratio.

Such lowering in the substantial aperture ratio caused by the protrusions or the slits provided in the MVA mode is not so large as that produced by the comb electrode in IPS. On the other hand, as compared with the TN mode, there is a defect of a smaller light transmittance of a liquid crystal panel (display panel) in the MVA mode. As a result, in the present circumstances, the MVA mode has not been applied to a notebook personal computer which requires smaller power consumption.

Furthermore, regarding the technique for polymerizing a polymerizable compound in a state of voltage application after a liquid crystal composition comprising the polymerizable compound is injected between substrates, when the liquid crystal panel is driven for a long time period with a pattern as shown in FIG. 1A, the problem of a display defect referred to as 'image sticking' as shown in FIG. 1B is produced. The image sticking is a phenomenon that a tile pattern as shown in FIG. 1B remains on the display, when a black-and-white checkered pattern as shown in FIG. 1A is displayed on the display area of a liquid crystal panel for a long time, followed by the whole area being set to a certain halftone display.

Here, an image sticking rate is defined as follows:

Image sticking rate $\alpha=((\beta-\gamma)/\gamma) \times 100(\%)$ $\beta$=luminance of the white display area after long-time display $\gamma$=luminance of the black display area after long-time display This is a phenomenon that while a liquid crystal display device is being used for a long time, the pre-tilt angle is changed in a voltage application section (at the time white is displayed in a normally black mode), which cannot easily be restored. It is considered that this pre-tilt angle change is produced by a change of the degree in regulating the liquid crystal alignment, as a result of the polymerizable compound in the liquid crystal layer that has remained after polymerization being further polymerized by the backlight at the long time operation.

In a general use condition, it is sufficiently tolerable if the image sticking rate is 2% or less after the elapse of two days. In particular, when a special usage or a special use condition is taken into account in which the same image display is continued for a long time period, no problem may occur in practical usage if the image sticking rate of the liquid crystal panel is 0% for one month. Accordingly, as a whole, an image sticking rate of 0% for one month is preferred.

Furthermore, regarding the injection of a liquid crystal or a liquid crystal composition into a liquid crystal layer, there is a problem that a truncated-V shaped abnormal display portion appears on the opposite side of a liquid crystal injection inlet, particularly when gray is displayed. This is illustrated in FIG. 12, a schematic plan view of the liquid crystal panel. Numeral 122 is a seal wall surrounding the liquid crystal layer, and numeral 123 is a liquid crystal injection inlet for injecting and sealing the liquid crystal composition, etc. into this liquid crystal layer. The truncated-V shaped abnormal display portion 121 appears on the opposite side of the liquid crystal injection inlet.

One reason for this is considered to be that the liquid crystal or the liquid crystal composition having been injected collects contaminants derived from the seal wall. That is, it is considered that the liquid crystal or the liquid crystal composition that has collected the contaminants rebounds after reaching the seal wall side opposite to the injection inlet, and the contaminants are concentrated in this rebound portion, forming the abnormal display portion. FIG. 13 is a schematic plan view of a liquid crystal panel which schematically illustrates, by means of arrows, how the rebounding of the liquid crystal or the liquid crystal composition which has collected the contaminants occurs.

SUMMARY OF THE INVENTION

In consideration of the aforementioned problems, it is an object of the present invention to provide a technique for improving display performance of a liquid crystal panel, preventing irregularity in the alignment of the liquid crystal molecules. It is another object of the present invention to improve the resistance against the 'image sticking' display defect. It is still another object of the present invention to improve the resistance against the abnormal display which is considered to be caused by the injection of the liquid crystal or the liquid crystal composition. Other objects and advantages of the present invention will be clarified in the following explanation.

In one aspect of the present invention, there is provided a liquid crystal display device wherein a liquid crystal composition comprising a liquid crystal and a polymerizable compound that is polymerizable by either active energy rays or active energy rays combined with heat is disposed between a pair of substrates composed of a first substrate having scanning electrodes, signal electrodes, pixel electrodes and thin film transistors for applying voltage to a liquid crystal layer, and a second substrate having a counter electrode; and then, in a state that liquid crystal molecules present in a gap between a pixel electrode and at least either one of the signal electrodes and the scanning electrodes are tilted in a direction from the at least either one of the signal electrodes and the scanning electrodes toward the pixel electrode, the polymerizable compound is polymerized by active energy ray irradiation, or by both active energy ray irradiation and heat, with or without applying voltage between the electrodes. With the above aspect of the present invention, the irregularity in the alignment of liquid crystal molecules is prevented, and a liquid crystal display device with a liquid crystal panel having an improved display performance is provided.

In another aspect of the present invention, there is provided a liquid crystal display device wherein a liquid crystal composition comprising a liquid crystal and a polymerizable compound that is polymerizable by active energy rays or a combination of the active energy rays and heat, is disposed between a pair of substrates having electrodes for applying voltage onto a liquid crystal layer and a vertical alignment control film for causing liquid crystal molecules to be aligned vertically, and then the polymerizable compound is polymerized by active energy ray irradiation, or by both active energy ray irradiation and heat while applying voltage between the electrodes, so that the liquid crystal molecules have a pre-tilt angle, as a result of which, in the above liquid crystal display device, the amount of the polymerizable compound remaining in the liquid crystal phase after the polymerization is not more than 0.05 parts by weight per 100 parts by weight of the liquid crystal. With the above aspect of the present invention, a liquid crystal display device having an improved resistance against the 'image sticking' display defect can be provided.

Instill another aspect of the present invention, there is provided a liquid crystal display device comprising, between a pair of substrates, a first seal wall having a liquid crystal injection inlet, a liquid crystal layer surrounded by the first seal wall, a display section for displaying an image in the liquid crystal layer, and a non-display section disposed in the periphery of the display section, wherein the thickness of the liquid crystal layer at the non-display section is greater than the thickness of the liquid crystal layer at the display section, and in the non-display section, a second seal wall is provided at a position opposite to the liquid crystal injection inlet. With the above aspect of the present invention, a liquid crystal display device having improved properties against an abnormal display which is considered to be caused by the injection of the liquid crystal or liquid crystal composition. The above-mentioned aspects of the present invention may be applied in combination.

In still another aspect of the present invention, a manufacturing method of a liquid crystal display device is provided comprising: on a first substrate, providing scanning electrode, signal electrodes, pixel electrodes and thin film transistors for applying voltage to a liquid crystal layer; on a second substrate, providing a counter electrode; and between a pair of the first and second substrates, disposing a liquid crystal composition comprising a liquid crystal and a polymerizable compound that is polymerizable by either active energy rays or active energy rays combined with heat, the method further comprising, in a state that liquid crystal molecules present in a gap between the pixel electrode and at least either one of the signal electrodes and the scanning electrodes are tilted in a direction from the at least either one of the signal electrodes and the scanning electrodes toward the pixel electrode, polymerizing the polymerizable compound by active energy ray irradiation, or by both active energy ray irradiation and heat, with or without applying voltage between the electrodes. With this aspect of the present invention, irregularity in the alignment of liquid crystal molecules is prevented, and a liquid crystal display device with a liquid crystal panel having an improved display performance can be manufactured.

Instill another aspect of the present invention, there is provided a manufacturing method of a liquid crystal display device, comprising: disposing a liquid crystal composition comprising a liquid crystal and a polymerizable compound that is polymerizable by active energy rays or a combination of the active energy rays and heat, between a pair of substrates having electrodes for applying voltage onto a liquid crystal layer and a vertical alignment control film for causing liquid crystal molecules to be aligned vertically; and polymerizing the polymerizable compound by active energy ray irradiation, or by both active energy ray irradiation and heat while applying voltage between the electrodes, so that the liquid crystal molecules have a pre-tilt angle, wherein the polymerization is performed until the amount of the polymerizable compound remaining in the liquid crystal phase after the polymerization is decreased to not more than 0.05 parts by weight per 100 parts by weight of the liquid crystal. With this aspect of the present invention, it is possible to improve the resistance against the 'image sticking' display defect on the liquid crystal display device.

Instill another aspect of the present invention, there is provided a manufacturing method of a liquid crystal display device, comprising providing, between a pair of substrates, a first seal wall having a liquid crystal injection inlet, a liquid crystal layer surrounded by the first seal wall, a display section for displaying an image in the liquid crystal layer, and a non-display section disposed in the periphery of the display section, wherein: the thickness of the liquid crystal layer at the non-display section is greater than the thickness of the liquid crystal layer at the display section; and in the non-display section, a second seal wall is provided at a position opposite to the liquid crystal injection inlet. With this aspect of the present invention, it is possible to improve the resistance against the problem of abnormal display which is considered to be caused by the injection of the liquid crystal or the liquid crystal composition. It is to be noted that it is also possible to use the aspects of the aforementioned manufacturing methods in combination with each other.

In addition, in the aspects of the liquid crystal display device and the manufacturing method therefor, when a tilt of the liquid crystal molecules is to be regulated, preferably, the polymerizable compound is polymerized while voltage is applied to each electrode, so that the potential difference between the pixel electrode and the counter electrode is greater than the potential difference between the at least either one of the signal electrodes and the scanning electrodes and the counter electrode; by adjusting the thickness of an insulating layer installed between the pixel electrode and the at least either one of the signal electrodes and the scanning electrodes, a state is produced in which liquid crystal molecules in a gap between the pixel electrode and the at least either one of the signal electrodes and the scanning electrodes are tilted in a direction from the at least either one of the signal electrodes and the scanning electrodes toward the pixel electrode; more typically, the insulating layer provided between the pixel electrode and the at least either one of the signal electrodes and the scanning electrodes is composed of a plurality of layers; for the plurality of layers, an inorganic material layer and an organic material layer are used; the thickness of the insulating layer installed between the pixel electrode and the at least either one of the signal electrodes and the scanning electrodes is set in a range of from 1 to 5 μm; the thickness of the insulating layer installed between the pixel electrode and the signal electrode is greater than the thickness of the insulating layer provided between the scanning electrode and the signal electrode; when viewed from a direction substantially normal to the display screen of the liquid crystal display device, a surface portion on the first substrate side of liquid crystal layer contacting surfaces between the pixel electrode and the at least either one of the signal electrodes and the scanning electrodes forms a slope descending from the at least either one of the signal electrodes and the scanning electrodes toward the pixel electrode; more typically, regarding the pixel electrodes, a protrusion of which the peak is present on or over at least either one of the signal electrodes and the scanning electrodes is provided between two pixel electrodes adjacent to each other; when viewed from a direction substantially normal to the display screen of the liquid crystal display device, the at least either one of the signal electrodes and the scanning electrodes has a portion being overlaid with a portion of the pixel electrode; when viewed from a direction substantially normal to the display screen of the liquid crystal display device, a light-shielding portion is provided only in the vicinity of a portion opposite to the scanning electrode; and a color filter is provided on the second substrate; and vertical alignment control films are coated on the first and second substrates.

Furthermore, in the aforementioned aspects of the liquid crystal display device and the manufacturing method therefor, in regard to the restriction of the amount of the polymerizable compound remaining in the liquid crystal phase after the polymerization, preferably, the amount of the polymerizable compound remaining in the liquid crystal phase after the polymerization is not more than 0.02 parts by weight per 100 parts by weight of the liquid crystal; the polymerizable compound comprises an acrylate group, a methacrylate group, or both acrylate and methacrylate groups; particularly, the polymerizable compound comprises a plurality of acrylate or methacrylate groups in a molecule; the liquid crystal has a negative dielectric anisotropy; and the liquid crystal has a property of being nearly vertically aligned when no voltage is applied, and being tilted in a direction regulated by either protrusions formed on or over a substrate or slits of the electrode, when voltage is applied.

Furthermore, in the aforementioned aspects of the liquid crystal display device and the manufacturing method therefor, in regard to the seal wall, preferably, the material quality and the thickness of the second seal wall are each identical to the material quality and the thickness of the first seal wall; both ends of the second seal wall are positioned either in the vicinity of or in contact with the display section; the distance between the first seal wall and the second seal wall is greater than the distance between the display section and the second seal wall; a liquid crystal composition comprising a liquid crystal and a polymerizable compound that is polymerizable by either active energy rays or active energy rays combined with heat, is disposed in the liquid crystal layer, and the polymerizable compound is polymerized by active energy ray irradiation, or by both active energy ray irradiation and heat; the polymerizable compound comprises an acrylate group, a methacrylate group, or both acrylate and methacrylate groups; particularly, the polymerizable compound comprises a plurality of acrylate or methacrylate groups in a molecule; the liquid crystal has a negative dielectric anisotropy; and the liquid crystal has a property of being nearly vertically aligned when no voltage is applied, and being tilted in a direction regulated by either protrusions formed on or over a substrate or slits of the electrode, when voltage is applied.

All in all, a high-quality liquid crystal display device and a manufacturing method therefor are realized by the present invention.

BRIEF DESCRIPTION OF THE DRAWINGS

FIG. 2 shows a schematic plan view of a display panel illustrating the disposition of bus lines and pixel electrodes, when viewed from a direction substantially normal to the display screen of a liquid crystal display device;

DETAILED DESCRIPTION OF THE INVENTION

Figure 1A:
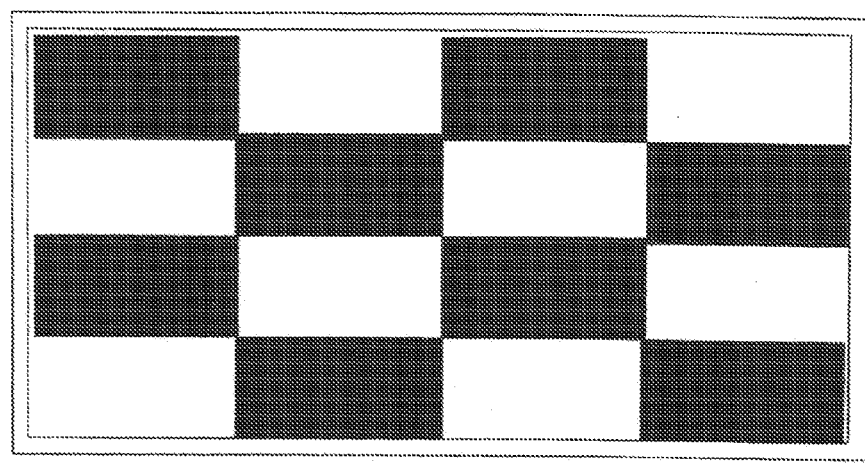
FIG. 1A shows a schematic plan view illustrating a display pattern of a liquid crystal display panel for the 'image sticking' evaluation.

The preferred embodiment of the present invention is described hereinafter referring to the drawings, tables, examples, etc. It is to be noted that such drawings, tables and examples are for the purpose of exemplifying the present invention, and shall not limit the scope of the present invention. Needless to say, other embodiments may be included in the category of the present invention, without departing from the spirit of the present invention. In the following drawings, the same numeral refers to the element.

A liquid crystal display device according to the present invention has a display panel (liquid crystal panel), wherein a liquid crystal composition comprising a liquid crystal and a polymerizable compound that is polymerizable by either active energy rays or active energy rays combined with heat, is disposed between a pair of substrates composed of a first substrate having scanning electrode, signal electrodes, pixel electrodes, and thin film transistors, for applying voltage to a liquid crystal layer, and a second substrate having a counter electrode; and then, the polymerizable compound is polymerized by active energy ray irradiation, or by both active energy ray irradiation and heat, with or without applying voltage between the electrodes. As the active energy rays, preferably, ultraviolet rays are used.

The polymerizable compound according to the present invention is a compound having a molecular structure capable of tilting and aligning liquid crystal molecules to particular directions by controlling the director direction of the liquid crystal molecules when polymerized. The polymerizable compound also has a photoreactable group for polymerizing by active energy ray irradiation, or by both active energy ray irradiation and heat. An alkyl chain is popular as a molecular structure capable of tilting and aligning liquid crystal molecules to particular directions by regulating the director direction of the liquid crystal molecules. However, any other compound may be applicable, as long as tilting and aligning liquid crystal molecules to particular directions is made possible as a result of polymerization. An alkyl group having 16 to 18 carbons is preferable.

The polymerizable compound according to the present invention may be a so-called monomer or oligomer. Also, the photoreactable group of the polymerizable compound according to the present invention refers to a polymerizable functional group such as an acrylate group, methacrylate group, vinyl group, allyl group, and epoxy group which can be polymerized by active energy ray irradiation, or by both active energy ray irradiation and heat.

The polymerizable compound according to the present invention may be composed of a single component or a plurality of components. Preferably, the polymerizable compound is composed of a cross-linkable component, or comprises a cross-linkable component. As the cross-linkable component, exemplified are those having, in a molecule, a plurality of polymerizable functional groups including an acrylate group, methacrylate group, epoxy group, vinyl group, allyl group, or the like, and having a structural portion that is polymerizable with other molecules through irradiation of active energy rays such as ultraviolet rays, with or without heat. Here, the polymerizable compound having a ring structure such as an aromatic ring or an alicycle is advantageous, because a high polymerization reaction velocity may be achieved. The liquid crystal composition according to the present invention contains the above-mentioned polymerizable compound and liquid crystal molecules. If necessary, certain amounts of catalysts, polymerization initiators, and polymerization inhibitors may be included.

Figure 4:
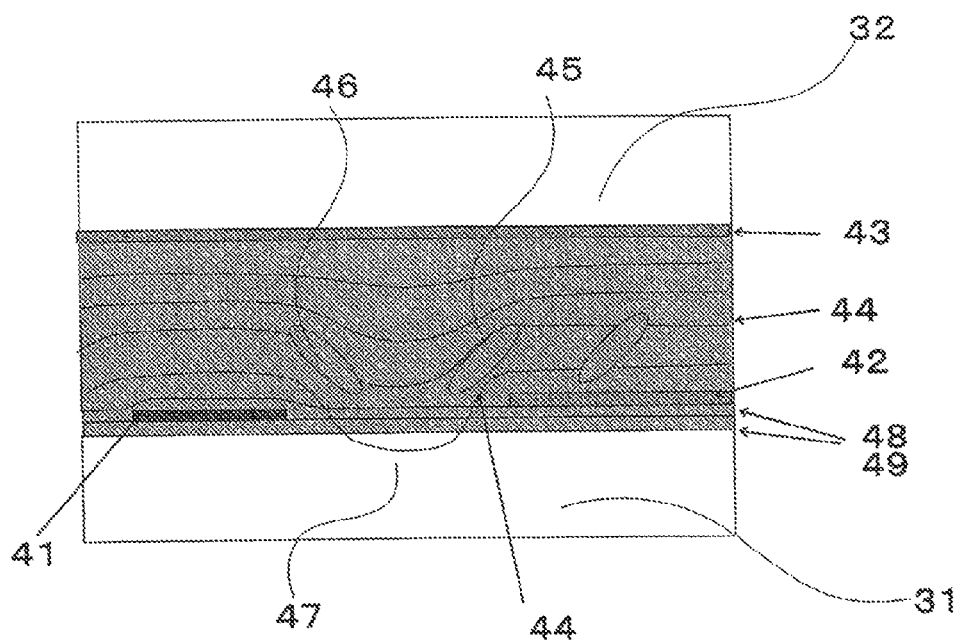
FIG. 4 shows a schematic diagram illustrating equipotential lines in a side cross-section of a display panel of a liquid crystal display device.

In a side cross-sectional view of the display panel in the liquid crystal display device, it has been found that irregularity produced in the alignment of the liquid crystal molecules is partly caused by turbulence of equipotential lines 44 between a bus line and a pixel electrode, as shown in FIG. 4. Here, in the description of the present invention, the term 'bus line' denotes a generic name of scanning electrode and signal electrode. The turbulence of the equipotential line tends to occur between a pixel electrode and either a scanning electrode or a signal electrode located nearer to the pixel electrode. The present invention is particularly effective when it is applied in regard to the signal electrode among the bus lines. This is because, in many cases, the electrodes are layered in the order of the scanning electrodes, signal electrodes and pixel electrodes, on the first substrate. Hereafter, the description will be given regarding the relation between the signal electrodes and the pixel electrodes. However, the present invention may also be applicable to the relation between the scanning electrodes and the pixel electrodes, unless otherwise stated.

FIG. 4 shows a schematic side cross-sectional view of a liquid crystal panel, illustrating a state that a signal electrode 41 and a pixel electrode 42 sandwiched between substrates 31 and 32 have an equal potential, and voltage is applied between a counter electrode 43 and the electrodes. FIG. 4 shows a schematic diagram based on the theoretically obtained equipotential lines, while a state of the liquid crystal molecules is based on imagination. The equipotential lines have a recessed portion 47 between the signal electrode and the insulating layer, and as a result, a liquid crystal molecule 45 and a liquid crystal molecule 46 incline in the opposite directions. When polymerization is performed in this state, irregularity in the alignment of the liquid crystal is memorized. It is to be noted that, in FIG. 4, numerals 48 and 49 each represent an insulating layer.

Figure 5:
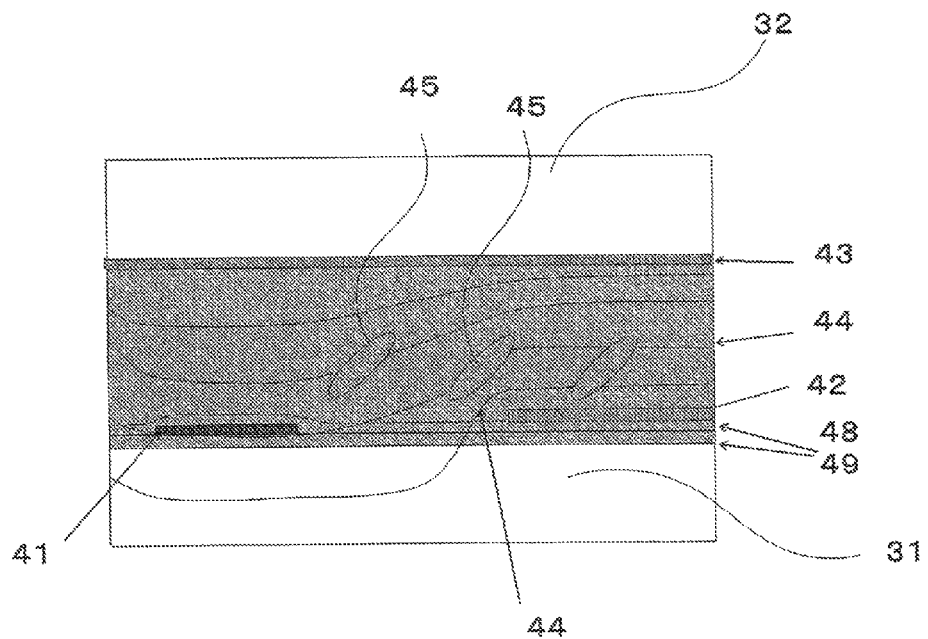
FIG. 5 shows another schematic diagram illustrating equipotential lines in a side cross-section of a display panel of a liquid crystal display device.

In order to restrain this irregularity in the alignment of the liquid crystal, it has been found effective to polymerize the polymerizable compound by active energy ray irradiation, or by both active energy ray irradiation and heat, with or without applying voltage between the electrodes, in a state that the liquid crystal molecules present in a gap between a pixel electrode and at least either one of the signal electrodes and the scanning electrodes, are tilted in a direction from the at least either one of the signal electrodes and the scanning electrodes toward the pixel electrode. In the case of polymerization with voltage applied between the electrodes, if it is possible to obtain equipotential lines having no recessed portion between the pixel electrode and the scanning electrode or the signal electrode, as shown in FIG. 5, the alignment direction of the liquid crystal molecules is made uniform, thus enabling restraint of the irregularity in the liquid crystal alignment. In the above description, it is difficult to actually observe the "state of liquid crystal molecules being tilted in a direction from the at least either one of the signal electrodes and the scanning electrodes toward the pixel electrode". However, disclination will be produced when there is "a state of liquid crystal molecules not being tilted in a direction from the at least either one of the signal electrodes and the scanning electrodes toward the pixel electrode". Accordingly, by confirming that no disclination occurs in the fabricated pixels, the above state, which is difficult to directly observe, can be easily confirmed. That is, according to the present invention, when it is intended to obtain the "state of liquid crystal molecules being tilted in a direction from the at least either one of the signal electrodes and the scanning electrodes toward the pixel electrode" (liquid crystal molecules having numeral 45 in the example of in FIG. 5), it is not necessary to recognize the very "state of liquid crystal molecules being tilted in a direction from the at least either one of the signal electrodes and the scanning electrodes toward the pixel electrode". It is sufficient to decide that the requirement is met, based on the fact that there is no disclination produced.

Any method is applicable to perform polymerization in a state that the liquid crystal molecules disposed in the gap between a pixel electrode and at least either one of the signal electrodes and the scanning electrodes are tilted in a direction from the at least either one of the signal electrodes and the scanning electrodes toward the pixel electrode.

For example, the above object can be achieved by applying voltage to each electrode so that the potential difference between the pixel electrode and the counter electrode is greater than the potential difference between the at least either one of the signal electrodes and the scanning electrodes and the counter electrode. However, the potential of the counter electrode must be higher (or lower) than both of the potential of the pixel electrode, and the potential of the signal electrode or the scanning electrode. It never happens that the counter electrode potential is higher than the potential of one of the electrodes but lower than the potential of the other electrodes. That is, the potential differences can be compared by their absolute values, and there is no case that the potential differences for comparison have opposite signs. For example, the following two cases are included in the category of the present invention: a case in which the counter electrode has +5 volts with respect to the pixel electrode, and +3 volts with respect to the signal electrode; and a case in which the counter electrode has −5 volts with respect to the pixel electrode, and −3 volts with respect to the signal electrode. In contrast, a case in which the counter electrode has +5 volts with respect to the pixel electrode, while −3 volts with respect to the signal electrode is not included in the category of the present invention.

FIG. 5 shows a schematic side cross-sectional view of a display panel in a situation of such voltage application as described above. Under such a condition of voltage application, the liquid crystal molecules between the pixel electrode and the signal electrode entirely incline in the direction toward the pixel electrode. Accordingly, disclination is not produced, and it is possible to prevent irregularity in the alignment of the liquid crystal molecules. Such an effect can also be obtained between the pixel electrode and the scanning electrode.

The relation of potentials shown in FIG. 5 can be obtained by applying a certain voltage to the signal electrode while the scanning electrode is ON, so as to set the pixel electrode potential, and then, changing the potential of the signal electrode by switching the scanning electrode OFF. By this, the alignment at the ends of pixels becomes stable, and light shielding becomes no more necessary.

Furthermore, by adjusting the thickness of an insulating layer installed between the pixel electrode and the at least either one of the signal electrodes and the scanning electrodes, the liquid crystal molecules in the gap between the pixel electrode and the at least either one of the signal electrodes and the scanning electrodes can be tilted in a direction from the at least either one of the signal electrodes and the scanning electrodes toward the pixel electrode.

Figure 6:
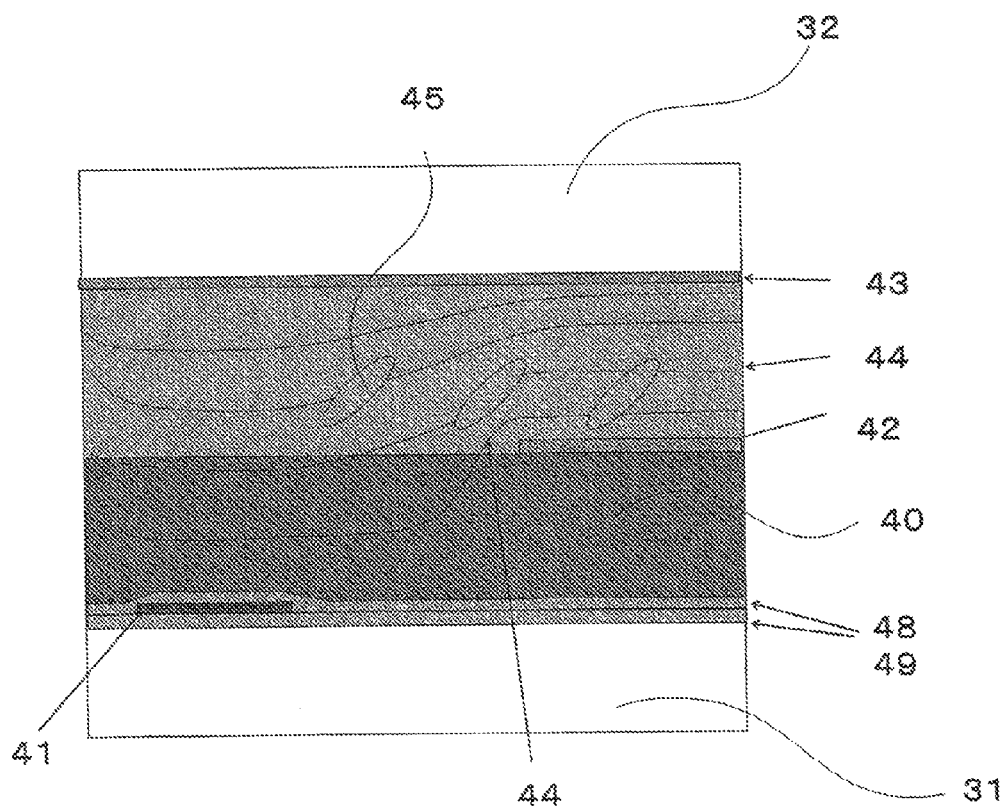
FIG. 6 shows another schematic diagram illustrating equipotential lines in a side cross-section of a display panel of a liquid crystal display device.

In general, insulating layers are provided respectively between the scanning electrodes, signal electrodes and pixel electrodes. The thickness of the insulating layer provided between the pixel electrodes and the signal electrodes or scanning electrodes is on the order of several tens to hundreds of nm. If, for example, the above thickness is changed to the order of 1 μm, using two layers of an insulating layer 48 and an insulating layer 40, it is possible to eliminate a recessed portion 47 in the equipotential lines shown in FIG. 4, and obtain the equipotential lines as shown in FIG. 6. That is, in this case, the same effect as the above can be obtained even when the polymerization is performed without adjusting the potential difference described above. For example, as in the ordinary case, polymerization may be performed while the signal electrodes and the pixel electrodes are set to an equal potential. Or, polymerization may be performed without applying voltage between the electrodes.

As the thickness of the insulating layer installed between the pixel electrodes and at least either one of the signal electrodes and the scanning electrodes, a range of 1 to 5 μm is preferable from a practical viewpoint. Here, setting to less than 1 μm is too small to sufficiently modify the shape of the equipotential lines. On the other hand, when the thickness exceeds 5 μm, nonuniformity of film thickness tends to occur, resulting in more difficult processes.

As a material for the insulating layer, any known materials are applicable, which may be exemplified by SiN and $SiO_2$. A material of higher permittivity is preferable, because the expected effect can be achieved by use of a relatively thin film.

The insulating layer may be composed of a single layer, or a plurality of layers as shown in FIG. 6. In many cases, materials such as SiN from which it is difficult to produce a thick film, are used for the insulating layers to be disposed between the pixel electrodes, signal electrodes and scanning electrodes. Therefore, a plurality of insulating layers in which a material from which it is easy to make a thick film is used in combination with such a material may be preferable in some cases. For example, a layer formed of an inorganic material such as SiN may be combined with a layer formed of an organic material. As an organic material, any known material may be used as long as the material is not contrary to the spirit of the present invention. An acrylic resin and a norbornene resin may examples of such a material.

In many cases, the signal electrodes are disposed between the scanning electrodes and the pixel electrodes when viewing the display screen of the liquid crystal display device from the cross-sectional direction. Therefore, preferably, the thickness of an insulating layer installed between the signal electrodes and the pixel electrodes is greater than the thickness of the insulating layer provided between the scanning electrodes and the signal electrodes. Also, regarding the insulating layers composed of a plurality of layers, it is preferable to use a positive type material for the layer to be added. The reason is that, when a hole (hereafter referred to as C-hole) for enabling the pixel electrodes conductive with the scanning electrodes is produced in this insulating layer through a photolithography process or the like, it may possibly lead to a failure in obtaining conductivity due to fractures of the pixel electrodes on the C-hole, unless appropriate tapering is provided thereon. For this purpose, it is preferable to use a positive type material, because of the ease of processing in producing a taper by which the opening gets narrower from the surface of the insulating layer toward the electrode.

Here, instead of adjusting the thickness of the above-mentioned insulating layer, the following method may be considered, for example: to provide a color filter layer on the signal electrode layer, and dispose the pixel electrodes thereupon, thus making the color filter layer also functioning as a portion of the insulating layer. However, it has been found that it is difficult to perform fine processing on the color filter layer, and accordingly, a large margin is necessary to provide a hole for obtaining conductivity between a pixel electrode and a scanning electrode, which results in a reduced aperture ratio. Also, in general, a color filter material is mostly of a negative type, and therefore, a problem similar to the above-mentioned case exists when producing a C-hole. Considering the above, when providing a color filter, it is preferably provided on the second substrate side, instead of the first substrate side.

Furthermore, as another method, it is effective to polymerize the polymerizable compound by active energy ray irradiation, or by both active energy ray irradiation and heat, in a state that the liquid crystal molecules present in a gap between a pixel electrode and at least either one of the signal electrodes and the scanning electrodes are tilted in a direction from the at least either one of the signal electrodes and the scanning electrodes toward the pixel electrode direction, by making a surface portion on the first substrate side of the liquid crystal layer contacting surfaces form a descending slope from the at least either one of the signal electrodes and the scanning electrodes toward the pixel electrode, the surface portion being in the liquid crystal layer contacting surfaces disposed between the pixel electrode and the at least either one of the signal electrodes and the scanning electrodes when viewed from a direction substantially normal to the display screen of the liquid crystal display device. In this case, polymerization may be performed with or without applying voltage between the electrodes. Also, it may be possible to adopt, or not to adopt, a method of polymerizing the polymerizable compound with voltage applied to each electrode, so that the potential difference between the pixel electrode and the counter electrode is greater than the potential difference between the at least either one of the signal electrodes and the scanning electrodes and the counter electrode. Furthermore, it may be possible to adjust, or not to adjust, the thickness of the insulating layer provided between the pixel electrode and the at least either one of the signal electrodes and the scanning electrodes.

Here, in the present invention, the term of 'liquid crystal layer contacting surface' does not simply mean the surface of the substrates but the surface of a layer with which the liquid crystal layer actually comes to contact. When the substrates and the liquid crystal layer are layered with insulating layers in between, and the liquid crystal layer contacts with the surface of the insulating layers but not the surface of the substrates, for example, the liquid crystal layer contacting surface according to the present invention is the surface of the insulating layers that the liquid crystal layer actually contacts. For example, when hydrophilic processing is performed on the surface of the insulating layer, the liquid crystal layer contacting surface is the processed surface.

Such a slope may be of an arbitrary shape, as long as it is a descending shape from the bus lines to the pixel electrodes. Also, the method for producing this slope is arbitrary. A method of forming protrusions of a shape descending from the bus lines to the pixel electrodes on the liquid crystal layer contacting surface is an example. The concrete shape of these protrusions can be defined arbitrarily in consideration of the alignment state of the liquid crystal molecules.

Also, it may be possible to provide a protrusion of which the peak is present on or over at least either one of the signal electrodes and the scanning electrodes between two adjacent pixel electrodes, since the signal electrodes, scanning electrodes and pixel electrodes are disposed in such a way that one signal electrode and one scanning electrode are sandwiched between two pixel electrodes adjacent to each other, when viewed from a direction substantially normal to the display screen. In this case, the position 'on either one of the signal electrodes and the scanning electrodes' is not necessarily located at the central portion of a signal electrode or scanning electrode. The position may be defined arbitrarily according to the alignment state of the liquid crystal molecules.

Figure 7:
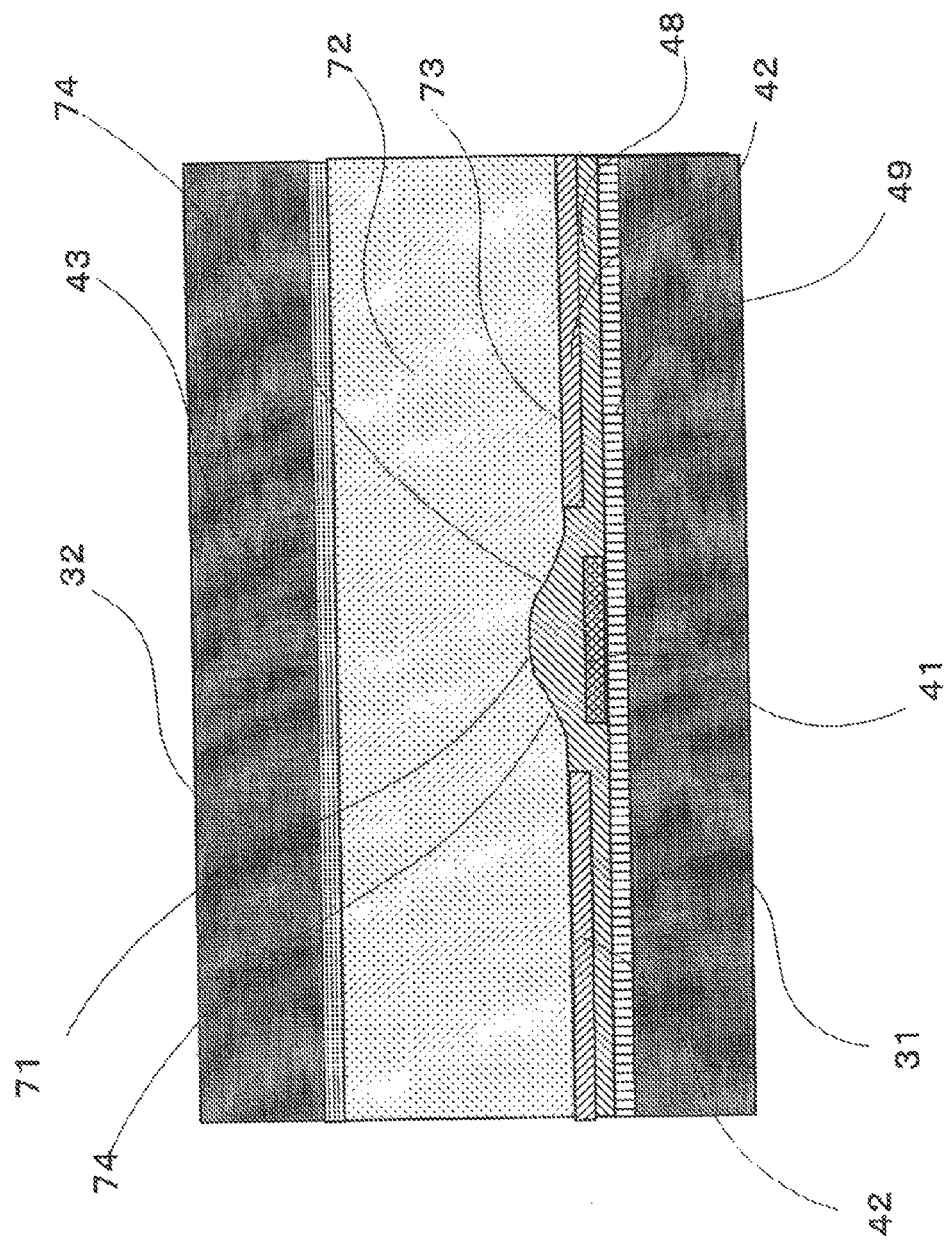
FIG. 7 shows a schematic side cross-sectional view of a liquid crystal display panel, illustrating a state that a protrusion having a peak disposed over a signal electrode is provided.
Figure 8:
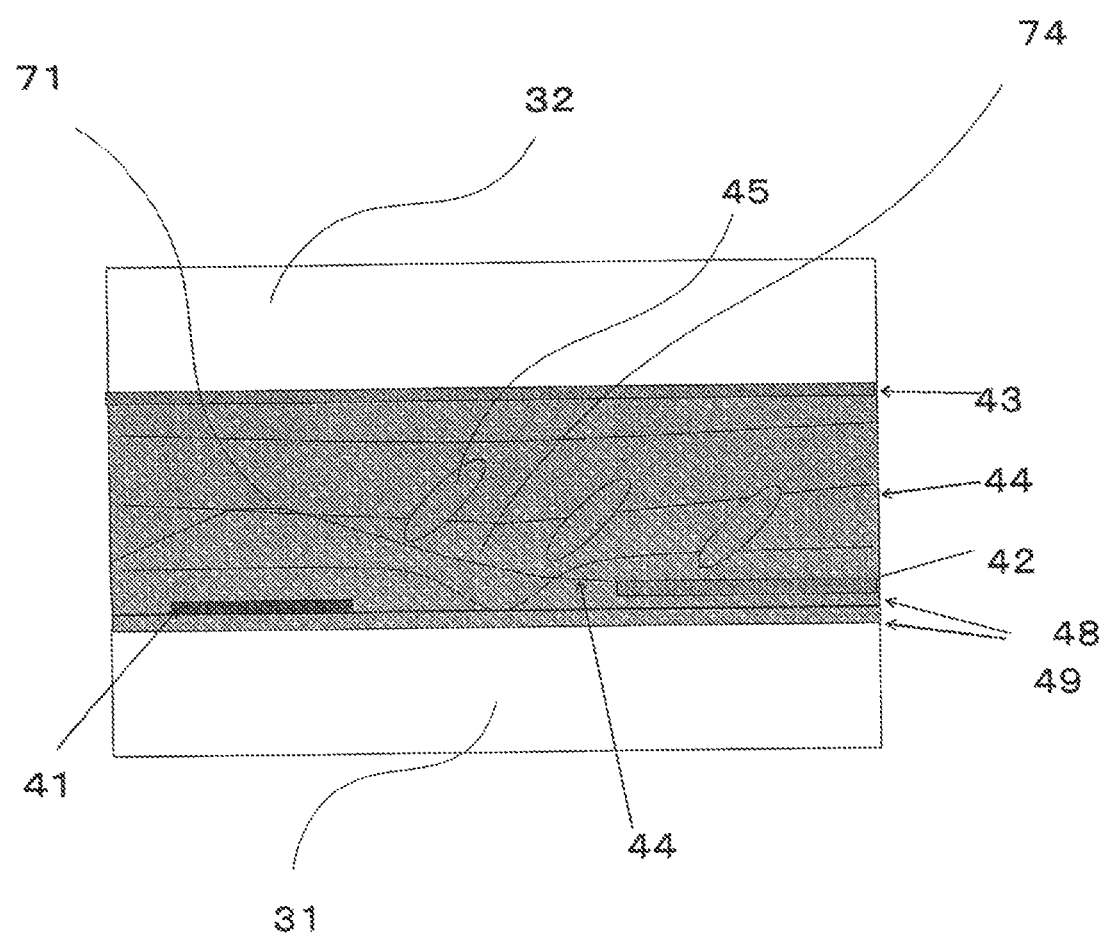
FIG. 8 shows a schematic diagram illustrating equipotential lines in the schematic side cross-section shown in FIG. 7.

FIG. 7 shows a schematic side cross-sectional view of a liquid crystal display panel illustrating a state that a protrusion is provided in the aforementioned manner. FIG. 8 shows a state when an electric field is provided to the structure shown in FIG. 7. In FIGS. 7 and 8, the protrusion 71 is provided on a signal electrode 41 so that a surface portion 73 on the first substrate side of the liquid crystal layer contacting surfaces of liquid crystal layer 72 forms a slope 74 descending from a signal electrode 41 toward a pixel electrode 42. With this slope of the protrusion 71, it is possible to make the liquid crystal molecules incline toward the pixel electrode side while overcoming the effect of the electric field. Accordingly, as shown in FIG. 8, even if a recessed portion of the equipotential line is present between a signal electrode and a pixel electrode, it is possible to make the alignment direction of the liquid crystal molecules uniform. That is, because the liquid crystal molecules located between a pixel electrode and a signal electrode entirely incline toward the direction of the pixel electrode, no disclination is produced, and irregularity in the alignment of the liquid crystal molecules on or over the pixel electrode can be avoided. While, in the above example, the protrusion 71 is formed by using a portion of the insulating layer, the protrusion can be formed using any material, as long as the material is not contrary to the spirit of the present invention.

By taking the aforementioned measures, irregularity in the alignment of the liquid crystal molecules is hard to be produced in the locations between the signal electrodes and the pixel electrodes, when viewed from a direction substantially normal to the display screen of the liquid crystal display device, and accordingly, satisfactory display quality may be obtained. Needless to say, any combination of the aforementioned measures may be adopted unless it is contradictory to the spirit of the present invention.

Figure 3:
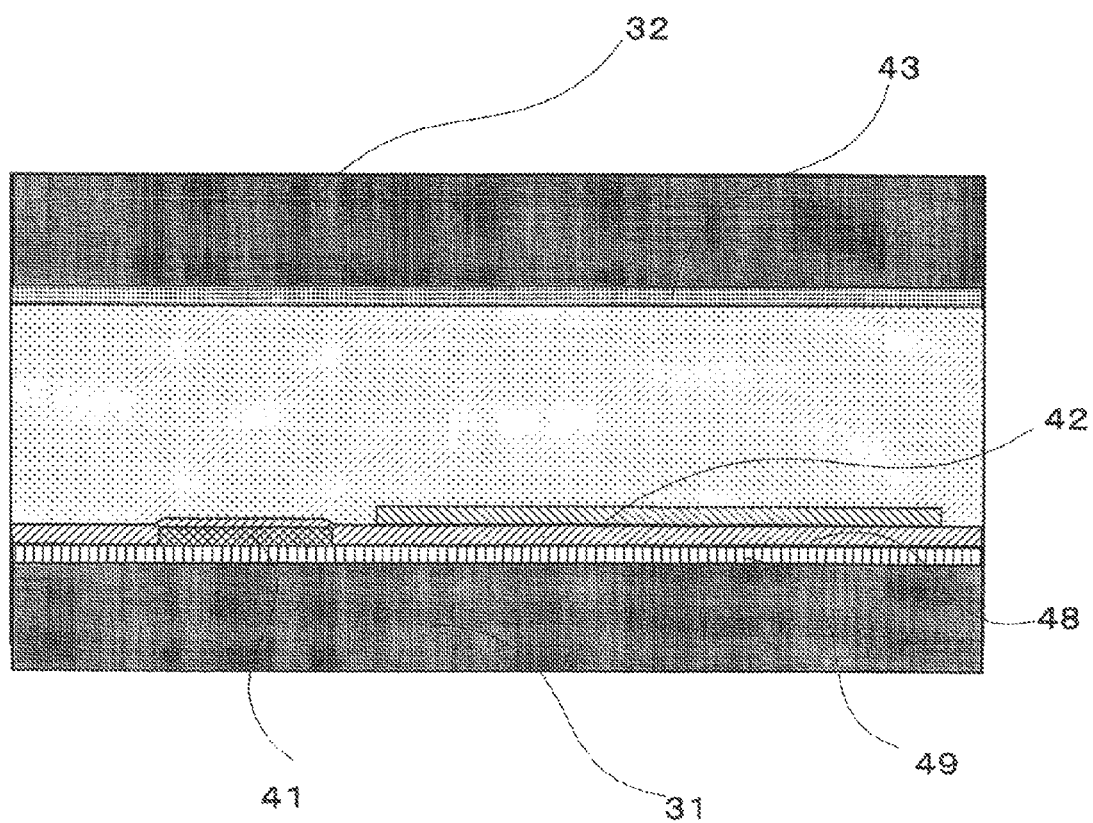
FIG. 3 shows a schematic side cross-sectional view of a display panel of a liquid crystal display device.
Figure 9:
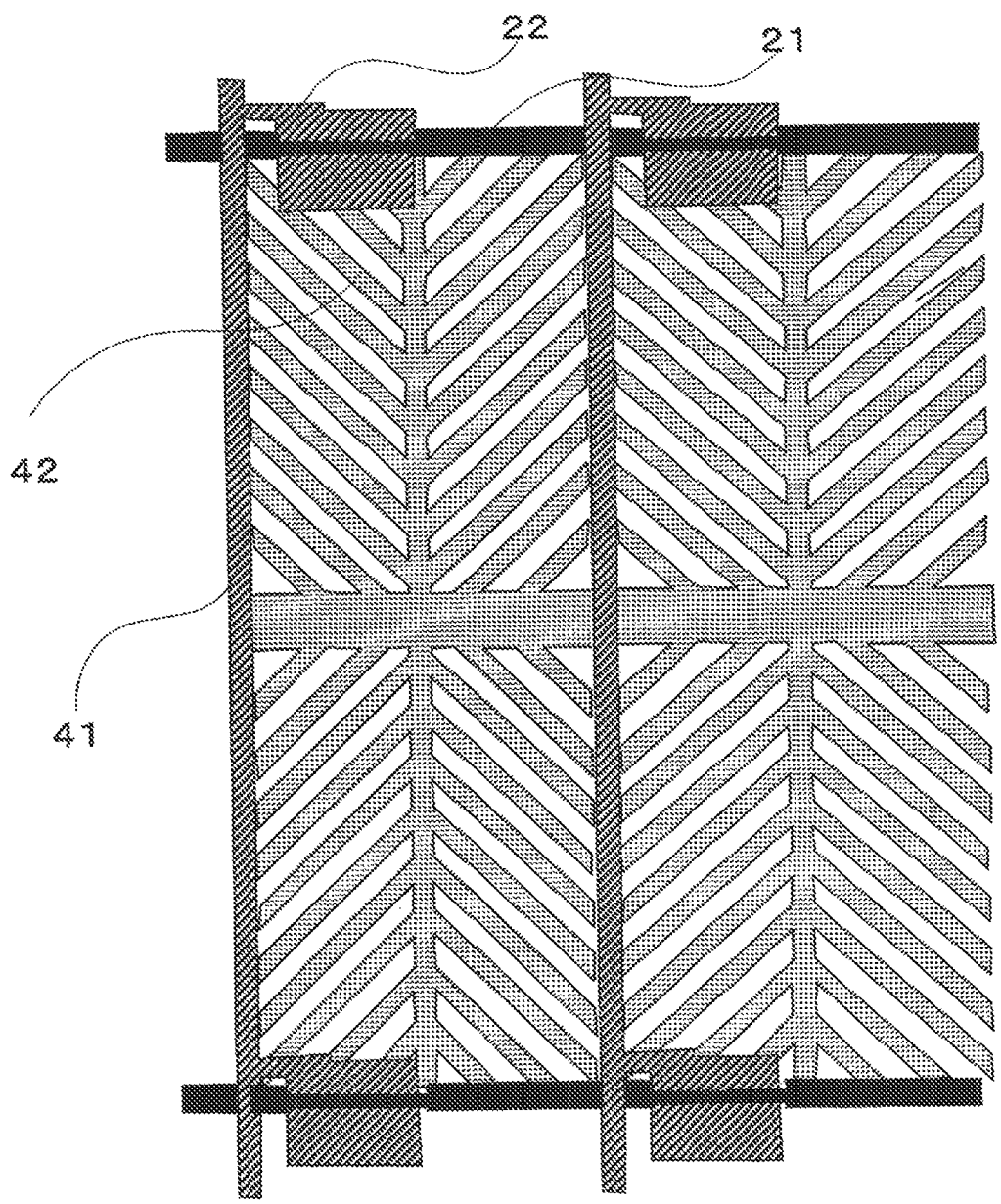
FIG. 9 shows a schematic plan view of a display panel illustrating the disposition of bus lines and pixel electrodes, when viewed from a direction substantially normal to the display screen of a liquid crystal display device.
Figure 10:
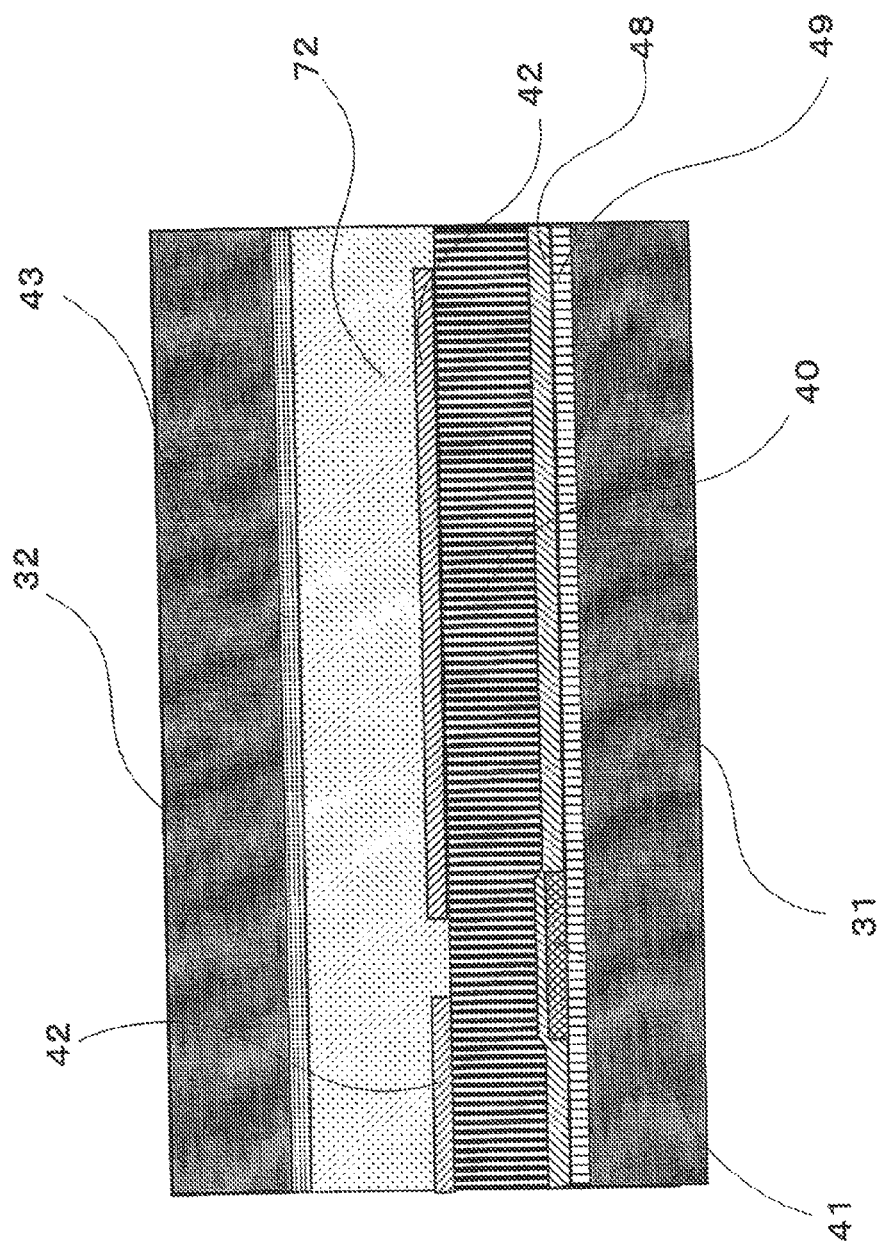
FIG. 10 shows a schematic side cross-sectional view of a display panel of a liquid crystal display device.

Furthermore, when adjusting the insulating layer, in general, a sufficient mutual distance is produced between the signal electrodes or the scanning electrodes, and the pixel electrodes. Accordingly, electric capacity produced by the signal electrodes, scanning electrodes and the pixel electrodes becomes smaller, crosstalk may be hard to occur, and accordingly, it is possible to overlay the pixel electrodes onto the signal electrodes. This situation is shown by the comparison of FIGS. 2 and 3 with FIGS. 9 and 10. Here, FIGS. 2 and 9 respectively show schematic plan views of display panels illustrating the disposition of the bus lines and the pixel electrodes, when viewed from a direction substantially normal to the display screens of the liquid crystal display devices. FIGS. 3 and 10 show schematic side cross-sectional views of display panels of liquid crystal display devices. FIGS. 2 and 3 represent the conventional disposition, in which a portion 23 without a pixel electrode is present between the signal electrode 41 and the pixel electrode 42 which are sandwiched between the substrates 31 and 32, and also present between the scanning electrode 21 (not shown in FIG. 3) and the pixel electrode 42. Since this portion does not contribute to the image display, the aperture ratio is correspondingly smaller. In contrast, FIGS. 9 and 10 illustrates the disposition according to the present invention, in which a portion not contributing to the image display disappears between the signal electrode 41 and the pixel electrode 42, and also between the scanning electrode 21 and the pixel electrode 42. Accordingly, the aperture ratio can be extended correspondingly. That is, when viewed from a direction substantially normal to the display screen of the liquid crystal display device, a portion of the scanning electrode overlaid by the pixel electrode, or a portion of the signal electrode overlaid with the pixel electrode, can be formed. Thus, the aperture portion can be extended. Here, numeral 22 represents a thin layer transistor.

It is to be noted that, during the operation of a liquid crystal display device, the time when the scanning electrodes have a lower potential than the pixel electrodes is generally long, and the effect of the electric field may sometimes disturb the alignment of the liquid crystal on or over the pixel electrode, sometimes resulting in so-called KURO-UKI (emerging of black spots). To prevent this, it is preferable to provide a light-shielding portion in the vicinity of a portion opposite to the scanning electrodes, when viewed from a direction substantially normal to the display screen of the liquid crystal display device. For example, the light-shielding portion is preferably provided at a portion opposite to a scanning electrode and a portion slightly projecting from the portion. The actual location of the 'vicinity' and the degree of 'slightly projecting' may be determined arbitrarily, depending on the actual circumstances.

Furthermore, regarding the alignment control film, it is preferable to provide a vertical alignment control film from the viewpoint of display quality. In this case, the vertical alignment control film may be provided on either one of the first substrate side and the second substrate side. The vertical alignment control film may be more preferably provided on both substrates in view of display quality enhancement.

With the above-mentioned techniques, it is possible to prevent irregularity in the alignment of the liquid crystal molecules, and improve display performance of the liquid crystal panel.

To improve the resistance against the display defect of 'image sticking', in a liquid crystal display device wherein a liquid crystal composition comprising a liquid crystal and a polymerizable compound polymerizable by active energy rays or a combination of active energy rays and heat is disposed between a pair of substrates having electrodes for applying voltage onto a liquid crystal layer and vertical alignment control films for causing the liquid crystal molecules to be aligned vertically, and the polymerizable compound is polymerized by the active energy ray irradiation, or by both the active energy ray irradiation and the heat, while applying voltage between the electrodes, thereby enabling the liquid crystal molecules to have a pre-tilt angle, it is effective that the amount of the polymerizable compound remaining in the liquid crystal phase after the polymerization is not more than 0.05 parts by weight per 100 parts by weight of the liquid crystal. Here, 'the liquid crystal molecules to have a pre-tilt angle' means that the liquid crystal molecules are aligned to a direction slightly tilted from the vertical direction with a certain orientation, when no voltage is applied, so that the liquid crystal molecules have a property of being tilted with the direction being regulated, when voltage is applied.

The amount of the polymerizable compound remaining in the liquid crystal phase after the polymerization is preferably not more than 0.02 parts by weight per 100 parts by weight of the liquid crystal. Here, it is not necessary that this polymerizable compound has a required value immediately after the process of 'polymerizing the polymerizable compound by the active energy ray irradiation or the active energy ray irradiation and heat'. It is sufficient if this value can be attained before use. In the present invention, for example, 'the amount of the polymerizable compound remaining in the liquid crystal phase after the polymerization is not more than 0.05 parts by weight per 100 parts by weight of the liquid crystal' means that the polymerizable compound is decreased to not more than a certain parts by weight according to the above-mentioned context.

The amount of the polymerizable compound remaining in the liquid crystal layer can be usually determined by gas chromatography (GC). A simple measuring method is shown below:

Amount of the residual polymerizable compound=(the peak area of the polymerizable compound in the GC after the polymerization reaction/the peak area of the polymerizable compound in the GC before the polymerization reaction)×the amount of polymerizable compound before the polymerization reaction.

Figure 1B:
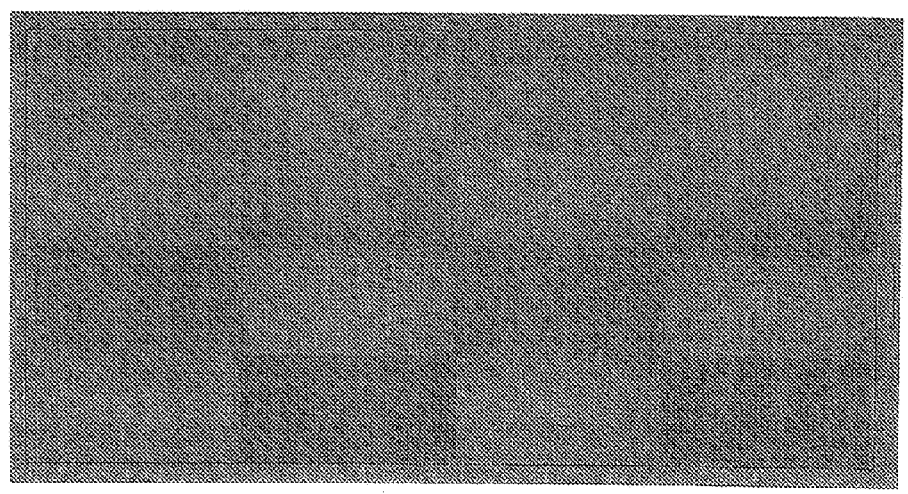
FIG. 1B shows a schematic plan view illustrating a display screen of a liquid crystal display panel that has produced an 'image sticking'.

It has been confirmed that the resistance against the 'image sticking' as shown in FIG. 1B can be improved by reducing the amount of the residual polymerizable compound in this way.

It is considered that this effect is produced by the fact that, when the reaction of the polymerizable compound by light or heat is insufficient, and an image sticking test as shown in FIG. 1A is performed in such a panel, the polymerization of the residual polymerizable compound is further promoted by the backlight at the long operation of the liquid crystal panel, resulting in a change of the pre-tilt angle to regulate the alignment of the liquid crystal. This change of the pre-tilt angle is irreversible, and produces a serious problem that is never cleared again once the image sticking occurs.

The reduction of the amount of the residual polymerizable compound is useful when the polymerizable compound has either of or both an acrylate group and methacrylate group. When the polymerizable compound has a plurality of acrylate or methacrylate groups in a molecule, the cross-linkable reaction is easy to occur by the function of the backlight at a long operation, and therefore, the reduction of the amount of the residual polymerizable compound is particularly useful.

Also, when the liquid crystal has a negative dielectric anisotropy, or in more detail, when the liquid crystal has a property of being nearly vertically aligned when no voltage is applied, and being tilted in a direction regulated by either protrusions formed on or over a substrate or slits of the electrode, when voltage is applied, regulation of the director direction of the liquid crystal molecules by the polymer plays an important role. Therefore, the reduction of the amount of the residual polymerizable compound is particularly useful. Here, 'nearly vertically aligned' means 'aligned with a pre-tilt angle' as described earlier, and does not mean a complete vertical alignment against the substrate.

With the above-mentioned technique, it is possible to improve the resistance against the display defect of 'image sticking'. It is to be noted that the above-mentioned technique for reducing the amount of the residual polymerizable compound can be used in combination with the techniques for controlling the alignment direction of the liquid crystal that have been described earlier. When combined, it is possible to improve the display quality further.

To cope with the problem of the truncated-V shaped abnormal portion which appears on the opposite side of the liquid crystal injection inlet, and is considered to be caused by injection of the liquid crystal or the liquid crystal composition into the liquid crystal layer, it has been found effective to provide, between a pair of substrates, a first seal wall having a liquid crystal injection inlet, a liquid crystal layer surrounded by the first seal wall, a display section for displaying an image in the liquid crystal layer, and a non-display section disposed in the periphery of the display section, to make the thickness of the liquid crystal layer at the non-display section greater than the thickness of the liquid crystal layer at the display section, and to install a second seal wall in the non-display section at a position opposite to the liquid crystal injection inlet.

Figure 14:
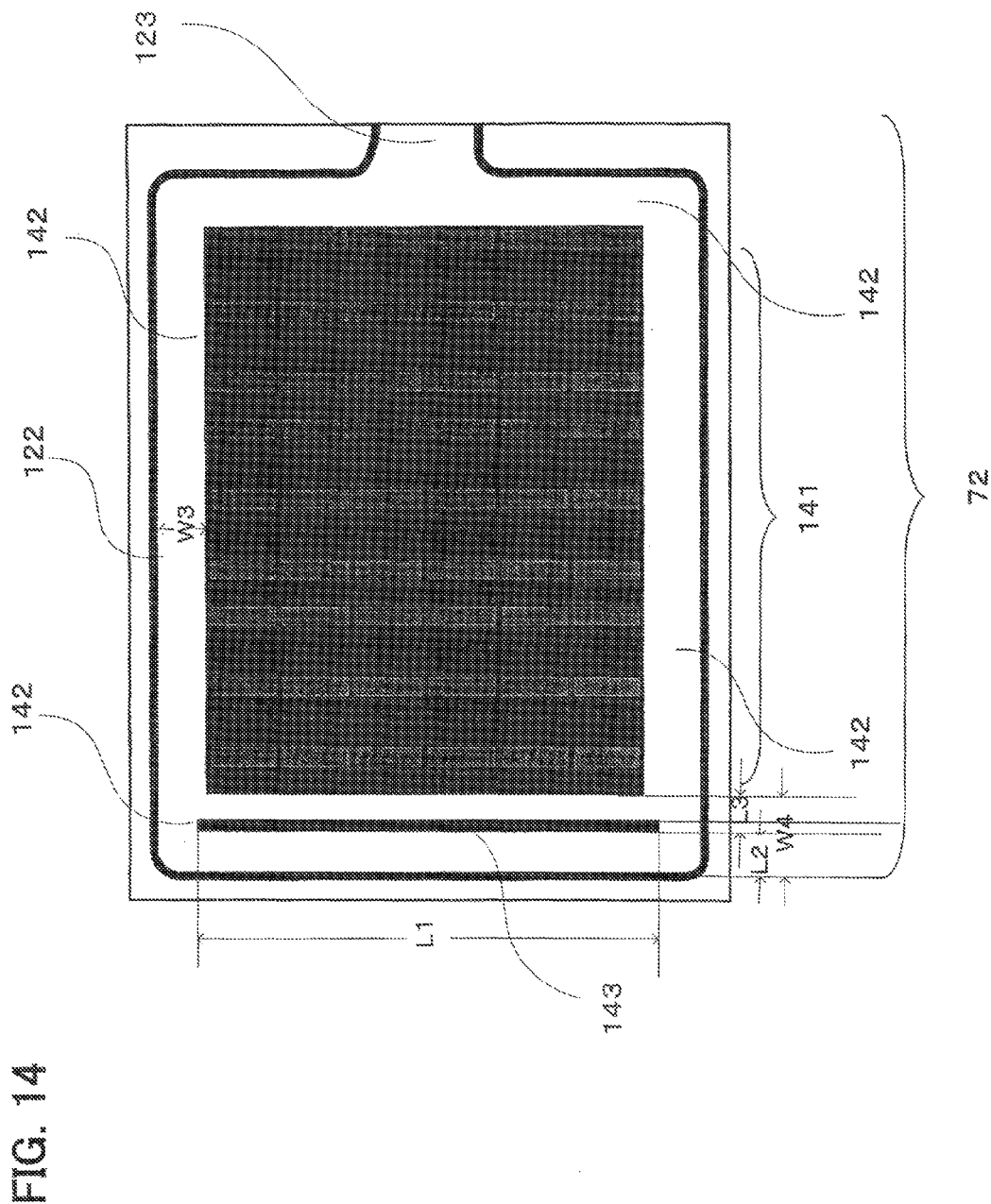
FIG. 14 shows another schematic plan view of a liquid crystal panel.
Figure 15:
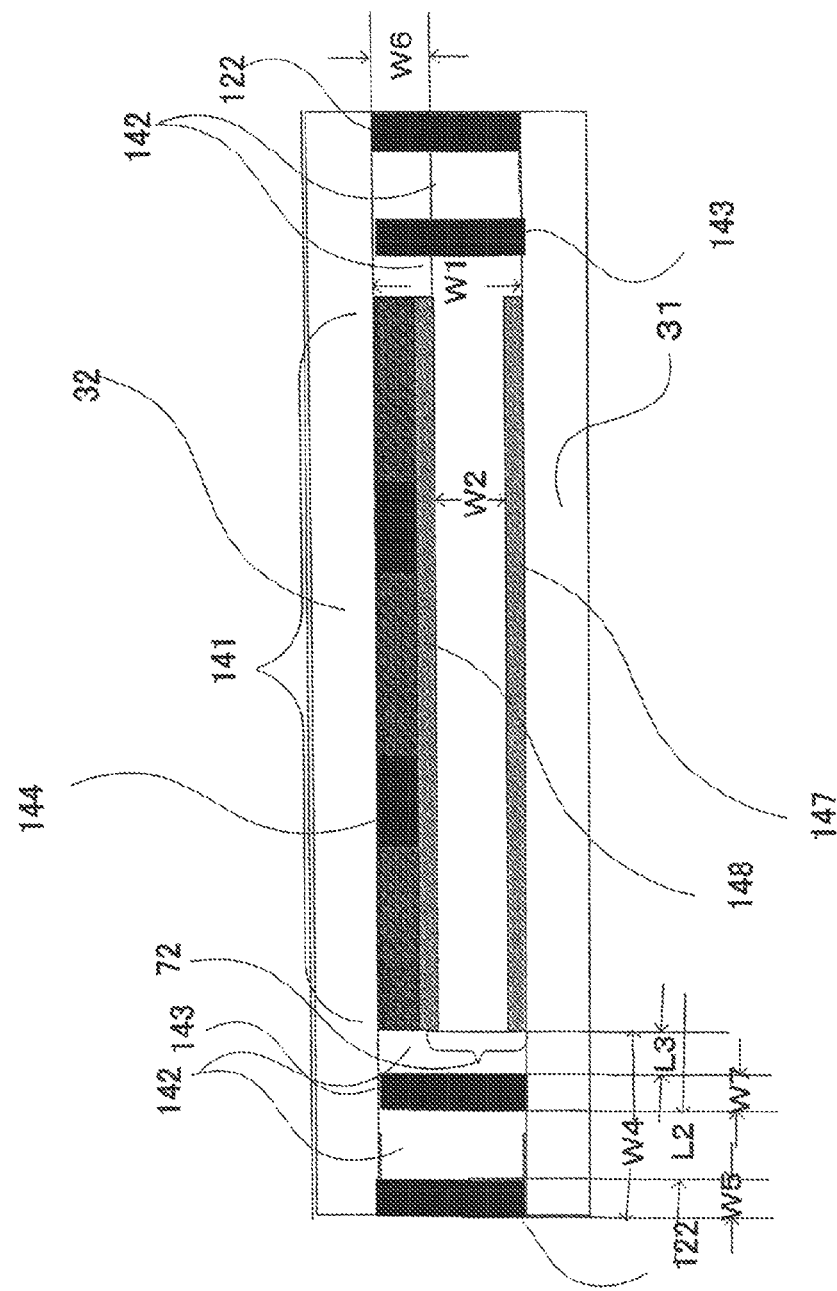
FIG. 15 shows a schematic side cross-sectional view of a liquid crystal panel shown in FIG. 14.

FIG. 14 shows a schematic plan view of a liquid crystal display device which comprises, between a pair of substrates, a first seal wall having a liquid crystal injection inlet, a liquid crystal layer surrounded by the seal wall, a display section for displaying an image in the liquid crystal layer, and a non-display section disposed in the periphery of the display section. FIG. 15 shows a side cross-sectional view of the above liquid crystal display device. In FIGS. 14 and 15, between a pair of substrates 31 and 32, there are shown a liquid crystal injection inlet 123, a first seal wall 122, a second seal wall 143, a liquid crystal layer 72, a color filter 144, upper and lower transparent electrodes 147 and 148, a display section 141 at a position corresponding to the color filter 144, and a non-display section 142. The liquid crystal layer 72 is surrounded by the first seal wall 122, and then sealed in the wall 122, by injecting the liquid crystal or the liquid crystal composition via the injection inlet 123 into the space between the substrates, followed by sealing the liquid crystal injection inlet 123.

The state that the thickness of the liquid crystal layer at the non-display section is greater than the thickness of the liquid crystal layer in the image display section, refers to the relation of W1 and W2 in FIG. 15 in which W1 is larger than W2. With this structure, the liquid crystal or the liquid crystal composition that has collected contaminants derived from the seal wall rebounds after reaching the seal wall on the left side in FIG. 15, without passing through the display section 144. Then, due to the presence of the second seal wall 143, the liquid crystal or the liquid crystal composition that has collected the contaminants stays between the first seal wall and second seal wall, without reaching the display section. In such a way, the resistance against an abnormal display which is considered to be caused by the injection of the liquid crystal or the liquid crystal composition is considered to have been improved. Here, regarding the width of the non-display section (W3 and W4 in FIG. 14), there is no particular limitation. However, the width may preferably be 0.5 mm or more. If it is set too large, the area occupied by the display section will be smaller in the whole display panel, and accordingly, an unnecessarily large area is not desirable for the non-display section.

Regarding the quality of material of the second seal wall, there is no particular limitation, and it can be decided arbitrarily depending on the actual circumstances. However, from the viewpoint of making the kinds of contaminants less complicated, it is preferable that the quality of material of the second seal wall is identical to the quality of material of the first seal wall.

Differently from the first seal wall, the second seal wall is not intended to prevent external leakage of the liquid crystal or the liquid crystal composition. Accordingly, it is not very important for the wall to completely seal the gap between the pair of the substrates (the gap between the upper and the lower substrates in FIG. 15). However, it is preferable that the sealing is effected to the extent that the liquid crystal or the liquid crystal composition that has collected the contaminants is prevented from passing through the gap between the second seal wall and the substrates and reaching the display section.

Preferably, the distance between the first seal wall and the second seal wall (represented by L2 in FIGS. 14 and 15) is greater than the distance between the display section and the second seal wall (L3 in FIGS. 14 and 15). The larger the distance between the first seal wall and the second seal wall is, the easier it is for the liquid crystal or the liquid crystal composition that has collected the contaminants to remain between the first seal wall and the second seal wall.

The size of the second seal wall can be determined arbitrarily, depending on the actual circumstances. However, it is preferable that the thickness of the second seal wall is identical to the thickness of the first seal wall, because a uniform cell thickness may easily be obtained. Also, if the second seal wall length L1 is too small, the liquid crystal or the liquid crystal composition that has collected the contaminants may show influence on the display section. Accordingly, it is preferable that an appropriate length is determined through experimentation or the like.

The shape of the second seal wall may not necessarily be straight. For example, a curved shape may also be applicable. It is to be noted that, in order to make it more difficult for the liquid crystal or the liquid crystal composition that has collected the contaminants to reach the display section, it is preferable that both ends of the second seal wall are positioned either in the vicinity of or in contact with the display section.

Figure 16:
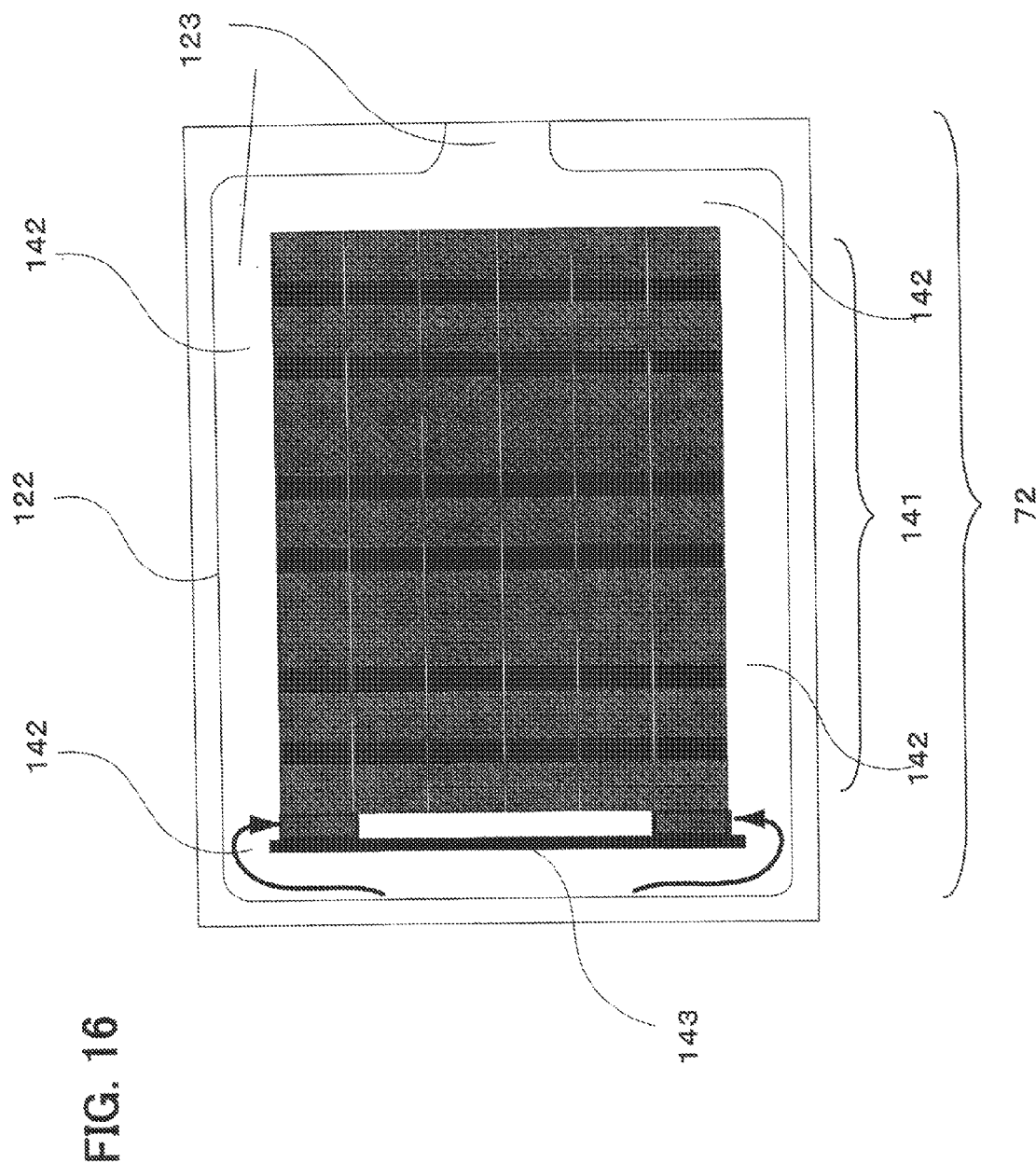
FIG. 16 shows another schematic plan view of a liquid crystal panel.
Figure 17:
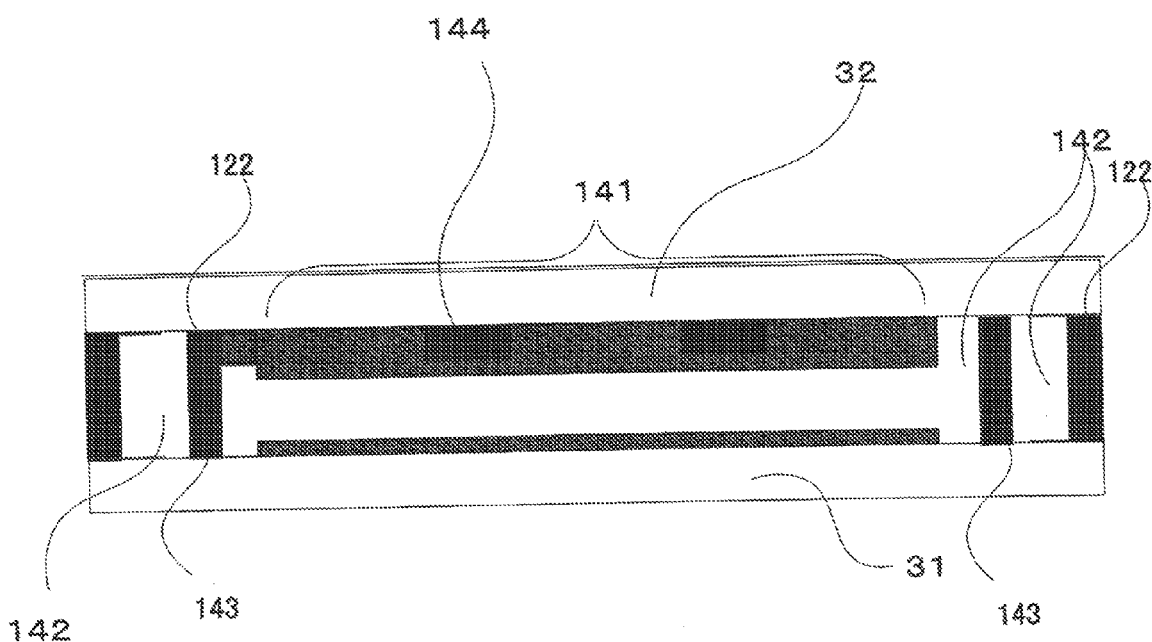
FIG. 17 shows a schematic side cross-sectional view of a liquid crystal panel shown in FIG. 16.

As a measure to achieve this, it is considered, for example, that portions of the color filter are extended to be in the vicinity of or in contact with both ends of the second seal wall, as shown in FIGS. 16 and 17. With this, it is easy for the liquid crystal or the liquid crystal composition, which has collected the contaminants, and then collided with the first seal wall and rebounded there as shown in FIG. 16, to be prevented from skirting around into the display section, as shown by arrows in FIG. 16. Here the degree of 'vicinity' may be determined appropriately through observing whether or not the liquid crystal or the liquid crystal composition influences the display section. It is to be noted that, when extending portions of the color filter, it is not always necessary to furnish the extended portions with an image display function. In this sense, there may be a case in which the 'display section' in the present invention includes a portion which does not display an image.

Furthermore, regarding the liquid crystal display device to which applied is a technique for improving the resistance against an abnormal display that is considered to be caused by the injection of the liquid crystal or the liquid crystal composition as mentioned above, it is preferable that a liquid crystal composition comprising a liquid crystal and a polymerizable compound capable of polymerizing by active energy rays or by a combination of the active energy rays and heat is disposed in a liquid crystal layer, and then the polymerizable compound is polymerized by active energy ray irradiation or by active energy ray irradiation and heat. To achieve the above object, the polymerizable compound preferably comprises an acrylate group or a methacrylate group, or both acrylate and methacrylate groups, and more particularly, the compound more preferably comprises a plurality of acrylate groups or methacrylate groups in a molecule. The liquid crystal for the use preferably has a negative dielectric anisotropy. Furthermore, as the liquid crystal composition comprising a liquid crystal and a polymerizable compound, it is preferable that the liquid crystal has a property of being nearly vertically aligned when no voltage is applied, and being tilted in the direction being regulated by either protrusions formed on or over a substrate or slits of the electrode, when voltage is applied.

The aforementioned technique for improving the resistance against an abnormal display that is considered to be caused by the injection of the liquid crystal or the liquid crystal composition, can be combined with the techniques for regulating the alignment direction of the liquid crystal and/or the techniques for reducing the amount of the residual polymerizable compound, which have been described earlier. Using these techniques in combination, the display quality can be improved further.

In the liquid crystal display device according to the present invention that is manufactured using one of the above-mentioned methods or a combination thereof, irregularity in the alignment of the liquid crystal molecules can be prevent, the resistance against a display defect of 'image sticking' is improved, or the resistance against the abnormal display which is considered to be caused by the injection of the liquid crystal or the liquid crystal composition, is improved. Furthermore, a combination of these effects can also be realized. Thus, the present invention is preferable for use in notebook computers, television sets, portable television sets, monitors and projection-type projectors.

Examples of Embodiment

Hereafter, embodimental examples according to the present invention and a comparative example are described in detail. It is to be noted that the following description is not intended to restrict the scope of the present invention.

In comparative example 1 and embodimental examples 1 to 4, the liquid crystal panels were produced under the following conditions, unless otherwise stated. When using the electrode structure shown in FIG. 2 or FIG. 9, the width's of the electrodes and the slits in the pixel electrodes were respectively set to 3 μm.

A 15-type XGA liquid crystal panel was used, with vertical alignment control films coated on both substrates (not shown in the figure). A diacrylate monomer was used as a polymerizable compound. Active energy rays (i-line, 365 nm) were irradiated at room temperature while a voltage corresponding to the voltage for white display was applied.

The scanning electrodes, signal electrodes and pixel electrode were disposed on the substrate (first substrate) in that order. A 300 nm thick SiN layer was placed between the scanning electrodes and the signal electrodes for insulation. A 300 nm thick SiN layer was also provided on the signal electrodes.

For the pixel electrodes, ITO was employed. A color filter (not shown in the figure) was provided on the counter substrate, and a counter electrode formed of ITO was layered on the color filter.

Comparative Example 1

The structure shown in FIGS. 2 and 3 was adopted. When polymerizing the monomer, a voltage of 20 V was applied to the pixel electrode, 20 V, to the signal electrode, and 0 V, to the counter electrode, respectively. As a result, the transmittance of the liquid crystal panel was improved by 15%, as compared with the conventional MVA mode liquid crystal panels having large protrusions and/or large electrode slits. However, irregularity in the alignment (disclination) appeared in some pixels.

Embodimental Example 1

The structure shown in FIGS. 2 and 3 was adopted. When polymerizing the monomer, a voltage of 20 V was applied to the pixel electrodes, as well as 10 V, to the signal electrodes, and 0 V, to the counter electrode. To simplify the voltage application, the entire signal electrodes and the entire scanning electrodes were wired for them to be able to be gathered into a bundle or bundles at one or a few points so as to allow simultaneous voltage application, the bundle or bundles being cut off after the polymerization of the monomer so that the bus lines were separated from each other.

As a result, irregularity in the alignment such as shown in the comparative example 1 was not produced. In this panel, a light-shielding film was disposed on parts of the counter electrode positioned opposite to the scanning electrodes and the vicinity thereof. Under this condition, a contrast value of 800 was obtained. The transmittance of the liquid crystal panel was improved by 15%, as compared with the conventional MVA mode liquid crystal panels having large protrusions and large electrode slits.

Embodimental Example 2

Figure 11:
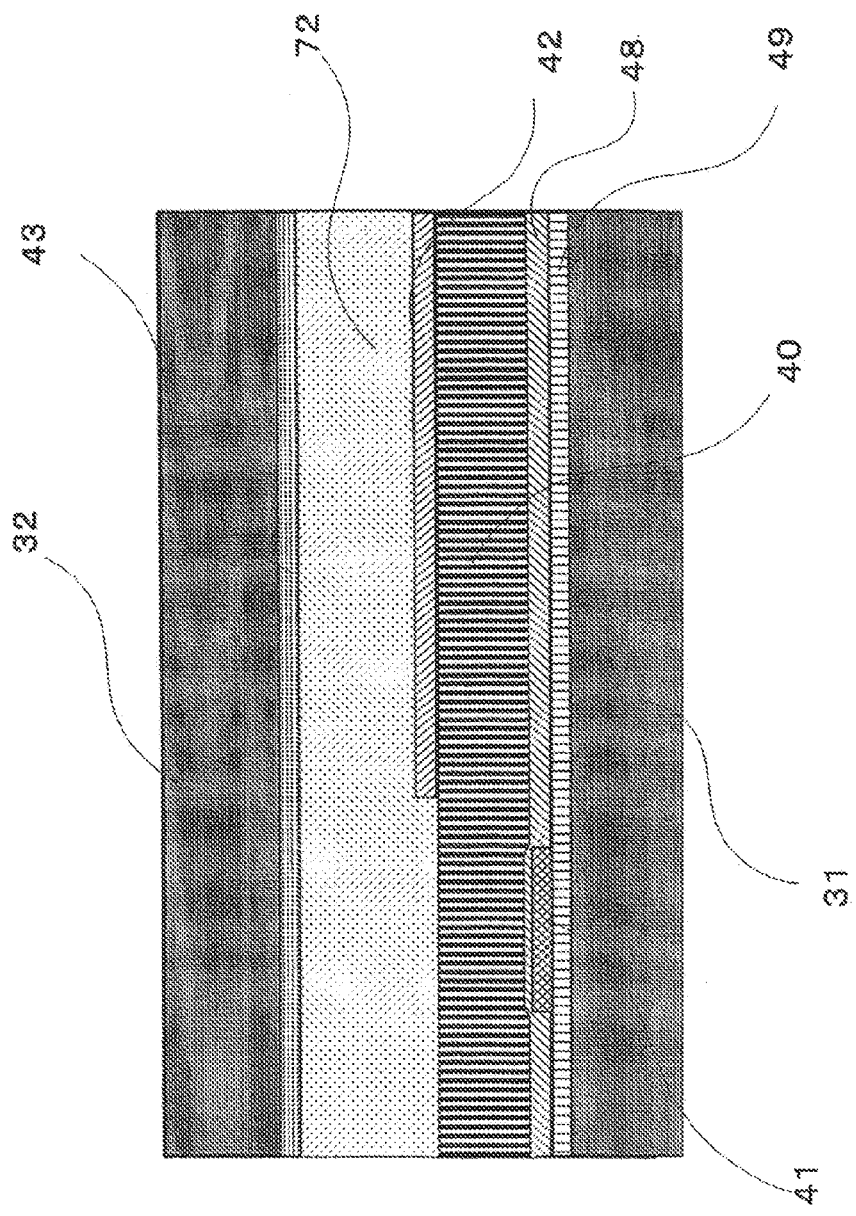
FIG. 11 shows another schematic side cross-sectional view of a display panel of a liquid crystal display device.
Figure 12:
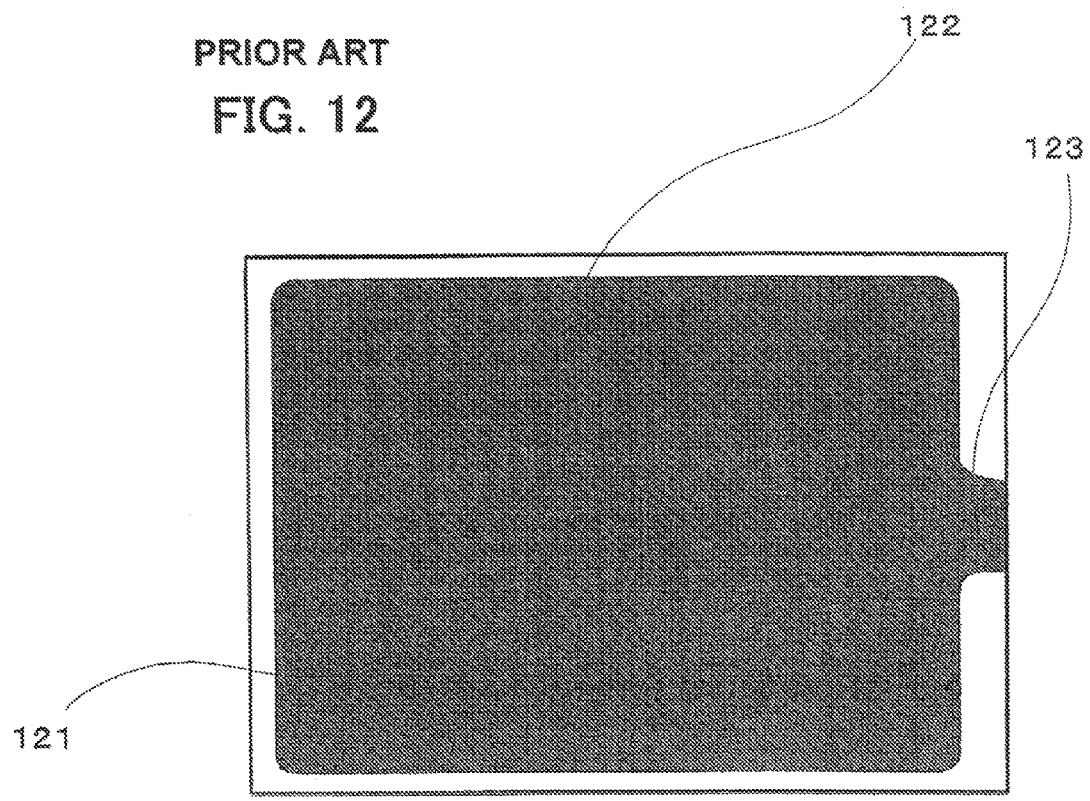
FIG. 12 shows a schematic plan view of a liquid crystal panel.
Figure 13:
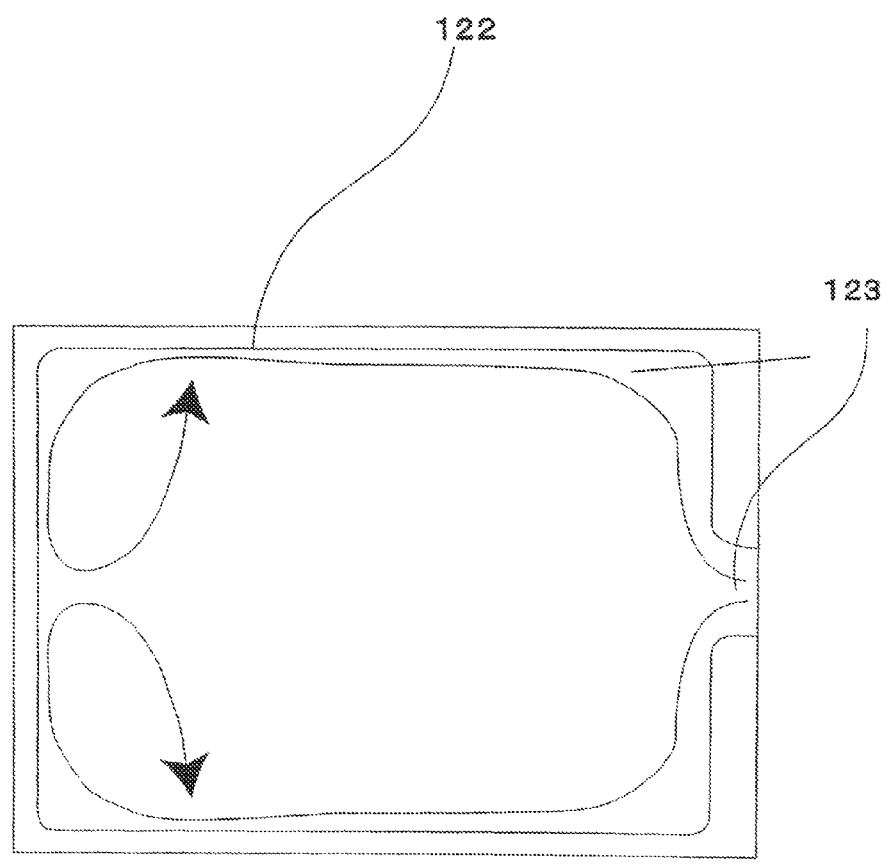
FIG. 13 shows another schematic plan view of a liquid crystal panel.

The planar structure shown in FIG. 2 was combined with the cross-sectional structure shown in FIG. 11. The thickness of the added insulating layer 40 was 3 μm. An acryl resin was used as a material constituting the insulating layer 40.

When polymerizing the monomer, a voltage of 20 V was applied to the pixel electrodes and the signal electrodes, while 0 V was applied to the counter electrode. A layer was provided on the counter substrate for shielding the light in the vicinity of the scanning electrodes.

As a result, such irregularity in the alignment as shown in the comparative example 1 was not produced. Furthermore, a contrast value of 800 was obtained.

The transmittance of this liquid crystal panel was improved by 30%, as compared with the conventional MVA mode liquid crystal panels having large protrusions and large electrode slits.

It is to be noted that it may also be possible to make the added insulating layer have the role of a color filter. In this case, the color filter layer on the counter substrate side becomes redundant.

Embodimental Example 3

The planar structure shown in FIG. 9 was combined with the cross-sectional structure shown in FIG. 10. The thickness of the added insulating layer 40 was 3 μm. When polymerizing the monomer, a voltage of 20 V was applied to the pixel electrodes and the signal electrodes, while 0 V was applied to the counter electrode.

As a result, such irregularity in the alignment as shown in the comparative example 1 was not produced. Furthermore, although any light-shielding layer other than the electrodes and the thin-film transistors was not provided, a contrast value at a front position exceeded 700, not causing any problem. The transmittance of this panel was improved by 37%, as compared with the conventional MVA mode liquid crystal panels having large protrusions and large electrode slits.

It is to be noted that it may also be possible to make the added insulating layer have the role of a color filter. In this case, the color filter layer on the counter substrate side becomes redundant.

Embodimental Example 4

The planar structure shown in FIG. 2 was combined with the cross-sectional structure shown in FIG. 7. A layer for insulating the light in the vicinity of the scanning electrodes was provided on the counter substrate. The added protrusions 71 had a height of 1.5 μm. When polymerizing the monomer, a voltage of 20 V was applied to the pixel electrodes and the signal electrodes, while 0 V was applied to the counter electrode.

As a result, such disclination in the alignment as shown in the comparative example 1 was not produced. A contrast value of 800 was obtained in this liquid crystal panel, and the transmittance was improved by 15%, as compared with the conventional MVA mode liquid crystal panels.

It is to be noted that, in the aforementioned embodiments, the alignment direction at the time of monomer polymerization was regulated by applying voltage to the fine-structure pixel electrodes as shown in FIGS. 2 and 9. Instead, it may also be possible to regulate the alignment direction by making the shape of the pixel electrodes rectangular and using fine conductive protrusions, or by performing a rubbing process.

Embodimental Example 5

A liquid crystal panel was produced using a material and a polymerization method shown below:
Liquid crystal: $\Delta\epsilon = -3.8$
Monomer: a liquid crystal composition was prepared by mixing 0.3 parts by weight of a bifunctional methacrylate monomer with 100 parts by weight of the liquid crystal.
Polymerization method: the liquid crystal composition was injected into the space between two substrates with electrodes formed thereon, while the cell thickness was controlled to be 4 μm using a spacer; and then, with a voltage of 10 V applied to the liquid crystal layer, specific amounts (0.5-10 $J/cm^2$) of ultraviolet rays were irradiated to the liquid crystal, at room temperature to furnish pre-tilt angles.

In TABLE 1, amounts of the residual monomer corresponding to the irradiation amounts and image sticking rates by the above-mentioned method are shown.

From the results, it was found that, in order to obtain an image sticking rate level of 2 days, which is required for general uses, a residual monomer concentration of 0.05% by weight or less is required, and to generate a panel with which no image sticking is produced for one month or more, which is required for special uses, a residual monomer concentration of 0.02% by weight or less is required.

TABLE 1

| UV amount ($J/CM^2$) | 0.5 | 2 | 4 | 6 | 8 | 10 |
|---|---|---|---|---|---|---|
| Residual monomer amount (pts. wt./ 100 pts. wt. of liquid crystal) | 0.25 | 0.1 | 0.05 | 0.03 | 0.02 | 0.015 |
| Image sticking rate (2 days) | 10% | 5% | 2% | 0 | 0 | 0 |
| Image sticking rate (7 days) | 15% | 8% | 5% | 1% | 0 | 0 |
| Image sticking rate (1 month) | 23% | 11% | 7% | 3% | 0 | 0 |

Embodimental Example 6

A liquid crystal panel was produced using the liquid crystal composition similar to that of the above embodimental example 5. The polymerization condition was as follows:
Polymerization method: the liquid crystal composition was injected into the gap between two substrates with electrodes formed thereon, while the cell thickness was controlled to be 4 μm, using a spacer, and then, ultraviolet rays of 1 $J/cm^2$ were irradiated to the liquid crystal at room temperature, while applying a voltage of 10 V to the liquid crystal layer. Afterwards, ultraviolet rays of 0-40 $J/cm^c$ were irradiated to the entire pixels of liquid crystal panels thus formed, at room temperature, under the condition of no voltage (0V) being applied.

In TABLE 2, the amounts of the residual monomer corresponding to the irradiation amounts and image sticking rates by the above-mentioned method are shown.

TABLE 2

| | UV amount ($J/CM^2$) (2nd irradiation) | | | | | |
|---|---|---|---|---|---|---|
| | 0 | 5 | 10 | 20 | 30 | 40 |
| Residual monomer amount (pts. wt./ 100 pts. wt. of liquid crystal) | 0.2 | 0.11 | 0.05 | 0.03 | 0.02 | 0.017 |
| Image sticking rate (2 days) | 7% | 5% | 2% | 0 | 0 | 0 |
| Image sticking rate (7 days) | 9% | 8% | 6% | 3% | 0 | 0 |
| Image sticking rate (1 month) | 14% | 12% | 9% | 4% | 0 | 0 |

From the result shown in TABLE 2, it was found that, in order to obtain an image sticking rate level of 2 days, which is required for general uses, a residual monomer concentration of 0.05% by weight or less is required, and to generate a panel with which no image sticking is produced for one month or more, which is required for special uses, a residual monomer concentration is 0.02% by weight or less is required.

That is, from the embodimental examples 5 and 6, it was confirmed that the residual monomer amount in the liquid crystal layer after the polymerization is required to be 0.05% by weight or less for a general use environment (on the order of 2 days), and 0.02% by weight or less is required to avoid the image sticking phenomenon after a long period of one month.

It is to be noted that the monomer is not limited to an acrylate (acrylic ester) or a methacrylate (methacrylic ester). A monomer having a functional group such as an epoxy group and a vinyl group may also be applicable. However, in general an acrylate group or a methacrylate group having a property of easily reacting by light or heat, is preferable from the viewpoint of a shorter reaction time. Also, regarding the number of functional groups in a monomer molecule, a monomer having a plurality of functional groups is preferable to a monofunctional (that is, having one function) monomer, from the viewpoint of monomer reactivity.

Furthermore, although a liquid crystal having a negative dielectric anisotropy was used in the examples, the liquid crystal according to the present invention is not limited to this. However, owing to the ease of realizing a wide viewing angle based on the multi-domain alignment of the liquid crystal without rubbing, liquid crystals having a negative dielectric anisotropy are preferable.

Embodimental Example 7

As a material of the first and the second seal wall, an ultraviolet-curable acrylic resin was used. It may also be possible to employ a thermosetting epoxy resin in place of the ultraviolet-curable acrylic resin.

The second seal wall was formed as shown in FIGS. 14 and 15. The width of the first seal wall (W5 in FIG. 15) was approximately 1 mm, the total thickness of the color filter and the transparent electrodes (W6 in FIG. 15) was approximately 2 μm, W1 was on the order of 6 μm, and W2 was on the order of 4 μm. Also, the distance W4 between the first seal wall and the display section shown on the left of FIG. 14 was set to 4.5 mm.

The second seal wall was formed as shown in FIGS. 14 and 15. The width of the second seal wall (W7 in FIG. 15) was approximately 1 mm. As shown in FIG. 14, the length of the second seal wall was shorter than the length of the first seal wall disposed in parallel, but was slightly longer than a side of the display section disposed in parallel with the second seal wall. Furthermore, L2=2 mm and L3=0.5 mm. The distances W3 between the first seal wall and the display section, shown on the upper and the lower parts of FIG. 14, were set to 2 mm. As a result, an abnormal display of a truncated-V shape which may possibly appear on the opposite side of the liquid crystal injection inlet could be avoided completely.

Embodimental Example 8

In addition to the structure of embodimental example 7, parts of the patterns of the color filter near its end were extended to be in contact with the second seal wall, as shown in FIG. 16. With this, it is possible to prevent the liquid crystal which has been injected along the seal 122 from unintentionally intruding into the gap between the second seal wall and the color filter.

It is to be noted that, although the 'skirting around' of the liquid crystal can be avoided by the seal 122 as described above, spaces in which the liquid crystal is not filled will never be generated, because vacuum injection is performed.

What is claimed is:

1. A manufacturing method of a liquid crystal display device having a liquid crystal layer between a pair of substrates, comprising:

disposing between the pair of substrates a liquid crystal composition which comprises liquid crystal molecules and a polymerizable compound that is polymerizable by active energy rays or a combination of active energy rays and heat, and polymerizing the polymerizable compound by active energy ray irradiation, or by both active energy ray irradiation and heat with and/or without applying voltages to the liquid crystal layer, so that a polymer formed by the polymerizing process decides an alignment of the liquid crystal molecules when no voltage is applied, wherein an amount of active energy ray irradiation is decided so that at least some of the polymerizable compound remains in the liquid crystal layer after the polymerization process, and further wherein the amount of the polymerizable compound that remains is not more than a predetermined value, and wherein the amount of the polymerizable compound (A) is calculated by a following equation:

$(A)$=(a peak area of the polymerizable compound in gas chromatography after the polymerizing process)/(a peak area of the polymerizable compound in gas chromatography before the polymerizing process)×(an amount of polymerizable compound before the polymerizing process).

2. The manufacturing method of a liquid crystal display device according to claim 1, wherein:
the predetermined value of the amount of the polymerizable compound is 0.05 parts by weight per 100 parts by weight of the liquid crystal layer.

3. The manufacturing method of a liquid crystal display device according to claim 1, wherein:
the predetermined value of the amount of the polymerizable compound is 0.02 parts by weight per 100 parts by weight of the liquid crystal layer.

4. The manufacturing method of a liquid crystal display device according to claim 1, wherein:
the amount of active energy ray irradiation is decided so that the amount of the polymerizable compound remaining in the liquid crystal layer immediately after the polymerization process is not more than the predetermined value.

5. The manufacturing method of a liquid crystal display device according to claim 1, wherein:
the amount of active energy ray irradiation is decided so that the amount of the polymerizable compound remaining in the liquid crystal layer before use of the liquid crystal display is not more than 0.05 parts by weight per 100 parts by weight of the liquid crystal layer.

6. The manufacturing method of a liquid crystal display device according to claim 1, wherein:
the amount of active energy ray irradiation is decided so that the amount of the polymerizable compound remaining in the liquid crystal layer before use of the liquid crystal display is not more than 0.02 parts by weight per 100 parts by weight of the liquid crystal layer.

7. A manufacturing method of a liquid crystal display device having a liquid crystal layer between a pair of substrates, comprising:

disposing between the pair of substrates a liquid crystal composition which comprises liquid crystal molecules and a polymerizable compound that is polymerizable by active energy rays or a combination of active energy rays and heat, and polymerizing the polymerizable compound by active energy ray irradiation, or by both active energy ray irradiation and heat with and/or without applying voltages to the liquid crystal layer, so that a polymer formed by the polymerizing decides an alignment of liquid crystal molecules when no voltage is applied, wherein the polymerizing process is performed until an amount of the polymerizable compound remaining in the liquid crystal layer is below a predetermined value, but wherein at least some of the polymerizable compound remains in the liquid crystal layer after the polymerizing process is performed, and wherein the predetermined value of the amount of the polymerizable compound is decided so that an amount of the polymerizable compound before use of the liquid crystal device is not more than 0.05 parts by weight per 100 parts by weight of the liquid crystal layer.

8. The manufacturing method of a liquid crystal display device according to claim 7, wherein:

the predetermined value of the amount of the polymerizable compound is decided so that an amount of the polymerizable compound before use of the liquid crystal device is not more than 0.02 parts by weight per 100 parts by weight of the liquid crystal layer.

9. A manufacturing method of a liquid crystal display device having a liquid crystal layer between a pair of substrates, comprising;

disposing between the pair of substrates a liquid crystal composition which comprises liquid crystal molecules and a polymerizable compound that is polymerizable by active energy rays or a combination of active energy rays and heat, and polymerizing the polymerizable compound by active energy ray irradiation, or by both active energy ray irradiation and heat with and/or without applying voltages to the liquid crystal layer, so that a polymer formed by the polymerizing process decides an alignment of liquid crystal molecules when no voltage is applied, wherein a condition of the polymerizing is decided in accordance with an amount of the polymerizable compound remaining in the liquid crystal layer after the polymerizing process value, but wherein at least some of the polymerizable compound remains in the liquid crystal layer after the polymerizing process is performed, and wherein the predetermined value of the amount of the polymerizable compound is between 0.02 and 0.05 parts by weight per 100 parts by weight of the liquid crystal layer.

10. A manufacturing method of a liquid crystal display device having a liquid crystal layer between a pair of substrates, comprising:

disposing between the pair of substrates a liquid crystal composition which comprises liquid crystal molecules and a polymerizable compound that is polymerizable by active energy rays or a combination of active energy rays and heat, polymerizing the polymerizable compound by active energy ray irradiation, or by both active energy ray irradiation and heat with and/or without applying voltages to the liquid crystal layer, so that a polymer formed by the polymerizing process decides an alignment of the liquid crystal molecules when no voltage is applied, wherein an amount of active energy ray irradiation is decided so that an amount of the polymerizable compound remaining in the liquid crystal layer after the polymerization process is not more than a predetermined value, and wherein the predetermined value of the amount of the polymerizable compound is between 0.02 and 0.05 parts by weight per 100 parts by weight of the liquid crystal layer.

11. A manufacturing method of a liquid crystal display device having a liquid crystal layer between a pair of substrates, comprising:

disposing between the pair of substrates a liquid crystal composition which comprises liquid crystal molecules and a polymerizable compound that is polymerizable by active energy rays or a combination of active energy rays and heat, polymerizing the polymerizable compound by active energy ray irradiation, or by both active energy ray irradiation and heat with and/or without applying voltages to the liquid crystal layer, so that a polymer formed by the polymerizing process decides an alignment of the liquid crystal molecules when no voltage is applied, wherein an amount of active energy ray irradiation is decided so that an amount of the polymerizable compound remaining in the liquid crystal layer after the polymerization process is not more than a predetermined value, and wherein the amount of the polymerizable compound (A) is calculated by a following equation:

$(A)$=(a peak area of the polymerizable compound in gas chromatography after the polymerizing process)/(a peak area of the polymerizable compound in gas chromatography before the polymerizing process)×(an amount of polymerizable compound before the polymerizing process).

12. A manufacturing method of a liquid crystal display device having a liquid crystal layer between a pair of substrates, comprising:

disposing between the pair of substrates a liquid crystal composition which comprises liquid crystal molecules and a polymerizable compound that is polymerizable by active energy rays or a combination of active energy rays and heat, polymerizing the polymerizable compound by active energy ray irradiation, or by both active energy ray irradiation and heat with and/or without applying voltages to the liquid crystal layer, so that a polymer formed by the polymerizing decides an alignment of liquid crystal molecules when no voltage is applied, wherein the polymerizing process is performed until an amount of the polymerizable compound remaining in the liquid crystal layer is below a predetermined value, and wherein the predetermined value of the amount of the polymerizable compound is decided so that an amount of the polymerizable compound before use of the liquid crystal device is not more than 0.05 parts by weight per 100 parts by weight of the liquid crystal layer.

* * * * *